(12) United States Patent
Gottschall

(10) Patent No.: US 7,291,686 B1
(45) Date of Patent: Nov. 6, 2007

(54) METHOD OF PRODUCING POLYMER NETWORK

(75) Inventor: Klaus Gottschall, Heddesheim (DE)

(73) Assignee: Dr. Gottschall Instruction Gesellschaft fur Technische Chromatographie mbH, Ludwigshafen (DE)

( * ) Notice: Subject to any disclaimer, the term of this patent is extended or adjusted under 35 U.S.C. 154(b) by 0 days.

(21) Appl. No.: 09/856,983

(22) PCT Filed: Nov. 26, 1999

(86) PCT No.: PCT/EP99/09199

§ 371 (c)(1),
(2), (4) Date: Sep. 17, 2001

(87) PCT Pub. No.: WO00/32648

PCT Pub. Date: Jun. 8, 2000

(30) Foreign Application Priority Data

Nov. 30, 1998 (DE) ............... 198 55 173
Jun. 21, 1999 (DE) ............... 199 28 236

(51) Int. Cl.
*C08F 2/00* (2006.01)

(52) U.S. Cl. ............ 526/128; 526/89; 526/308

(58) Field of Classification Search ........ 526/128, 526/89, 308
See application file for complete search history.

(56) References Cited

U.S. PATENT DOCUMENTS

| 4,076,916 A | 2/1978 | Lagow |
| 5,008,339 A | 4/1991 | Anson et al. |
| 5,089,364 A * | 2/1992 | Lee et al. ............ 430/59.1 |
| 5,902,599 A * | 5/1999 | Anseth et al. ............ 424/426 |
| 6,271,315 B1* | 8/2001 | Kiessling et al. ........ 525/326.1 |
| 6,558,607 B1* | 5/2003 | Winter et al. ............ 264/425 |

FOREIGN PATENT DOCUMENTS

| DE | 253027 | 1/1988 |
| DE | 281397 | 8/1990 |
| DE | 4341524 | 1/1997 |
| EP | 134041 | 3/1985 |
| EP | 184361 | 6/1986 |
| WO | WO 93/09075 | 10/1992 |

OTHER PUBLICATIONS

G. Wulff, Agew. Chemie 107 (1995) 1958; Agew. Chemie Int. Ed. 34 91995), pp. 1812-1832.
Menger et al., J. Org. Chem. 63 (1998), pp. 7578-7579.
M. Sanchez-Chaves "Poly (Vinylalcohol) functionalized by Monosuccinate Groups. Coupling of Bioactive Amino Comounds" Polymer, vol. 39, No. 13, 1998, pp. 2751-2757.
Printout from "chembytes e-zine" website at http://www.chemsoc.org/chembytes/ezine/1997/vulfson.htm, entitled "Assembling the Molecular Cast", dated 1997.

* cited by examiner

*Primary Examiner*—Robert D. Harlan
(74) *Attorney, Agent, or Firm*—Jones Day

(57) ABSTRACT

Process for the preparation of a polymeric network, in which
(i) one or more polymers are made available which can be crosslinked with one another intramolecularly or intermolecularly or intra- and intermolecularly by covalent or non-covalent bonding,
(ii) the conformation of at least one of the polymers is adapted to at least one template compound with obtainment of at least one preferred conformation of the at least one polymer,
(iii) at least one of the preferred conformations obtained according to (ii) is fixed by crosslinkage.

8 Claims, No Drawings

METHOD OF PRODUCING POLYMER NETWORK

BACKGROUND OF THE INVENTION

1. Field of the Invention

The present invention relates to a process for the preparation of a polymeric network, the polymeric network per se which is obtainable by the process according to the invention, and the use of the polymeric network in various industrial application areas.

2. Related Art

Polymeric structures which have pores in which a given substrate can be selectively bonded are of interest in a whole series of industrial applications. In this connection, reference may be made to substance separation processes, catalytic processes or the use of these polymeric structures as sensors.

WO 93/09075 describes a process for the preparation of a polymeric structure, in which a polymer is prepared by free-radical polymerization from the monomers in the presence of a crosslinking reagent and simultaneously in the presence of a substrate. Imprinting polymers are proposed for use in chromatography, in catalysis, as biosensors or as synthetic antibodies. G. Wulff gives an overview in Angew. Chem., Int. Ed. Engl. 34 (1995) 1812-1832.

The imprinting technique, however, has a number of disadvantages. Thus the imprints show an unacceptable peak broadening and, as a rule, incomplete substance elution in the chromatographic test, the latter leading to the cross-contamination of further product fractions. Industrial application of the imprints in chromatography is thus essentially excluded. Likewise, the imprints as a rule have a low loading ability with substrate, essentially in the per thousand range, as a result of which, obviously, an only extremely small quantitative throughput can be achieved and an industrial separation process could only be carried out uneconomically.

In J. Org. Chem. 63 (1998) 7578-7579, Menger et al. describe a process in which, starting from a combinatorial mixture, polyacrylic anhydride is reacted with three or four amines selected more or less at random, 14 different amine combinations in 96 different concentration ratios leading to 1344 different polymers. The polymers were employed in the catalytic dehydrogenation of a beta-hydroxyketone, where, however, less than 1 percent of all polymers were suitable for the catalytic process at all on account of the reaction rate. In connection with the experiments, it was observed that the polymers gradually develop a better catalytic activity in the presence of the substrate. However, the polymeric structures with improved activity were not stabilized, but labile structures were obtained such that the catalytically more active structures were destroyed by changes in the pH or the temperature.

SUMMARY OF THE INVENTION

Accordingly, a preferred aspect of the present invention relates to a process for the preparation of a polymeric network, in which (i) one or more polymers are made available which can be crosslinked with one another intramolecularly or intermolecularly or intra- and intermolecularly by covalent or non-covalent bonding, (ii) the conformation of at least one of the polymers is adapted to at least one template compound with obtainment of at least one preferred conformation of the at least one polymer and (iii) at least one of the preferred conformations obtained according to (ii) is fixed by crosslinkage.

DETAILED DESCRIPTION OF THE PREFERRED EMBODIMENTS

The term "template compound", as is used in the context of the present application, includes all compounds on which at least one conformation of the at least one polymer employed is adaptable. Thus possible compounds are all those which lead to a preferred conformation of the at least one polymer employed by interaction with the polymer. The interaction must in this case not take place with the polymer per se, but can also take place with a polymeric structure which is derived from the polymer employed, as is described further below.

Accordingly, template compounds which are possible are both chemical compounds and also biological structures, such as microorganisms, with respect to which, inter alia, e.g. pathogenic organisms, preferably viruses, bacteria or parasites may be mentioned. Likewise, for example, cells, fragments or constituents of cells, epitopes, antigenic determinants or receptors may be mentioned.

In the process according to a preferred aspect of the invention, the concentration of the template compound employed in solution or suspension is basically freely selectable.

Preferably, the concentration is in the range from 0.25 to 300 mmol/l, based on the solvent or solvent mixture employed. The solvents in which the template is employed are likewise essentially freely selectable. Organic and aqueous solutions are preferred, preferred solvents being, inter alia, chlorohydrocarbons having up to three C atoms, nitriles such as acetonitrile, esters such as ethyl acetate, ketones such as methyl ethyl ketone or acetone, open-chain or cyclic ethers such as THF or dioxane or aromatic compounds such as toluene or xylenes or mixtures of two or more of these compounds. The pH range of the solutions is essentially freely selectable and can be coordinated with the polymers and the template compound. Preferably, the pH range during fixing is in the range from 3 to 12, preferably in the range from 4 to 9 and particularly preferably in the range from 6 to 8.

The term "preferred conformation", as is used in the context of the present invention, designates a conformation of the polymer which results from one or more steps of the process according to the invention, the interaction enthalpy between the preferred conformation and the template compound being greater in amount than the interaction enthalpy between the template compound and that conformation which the polymer has before this one or before this number of steps.

Preferably, this difference in amount in the interaction enthalpy is greater than 0.1 kcal/mol, particularly preferably than 1 kcal/mol and very particularly preferably greater than 3 kcal/mol.

As already indicated and described in detail further below, the polymeric networks prepared according to the invention can be employed, inter alia, in substance separation processes. It is obviously possible here that substances which are to be separated under the reaction conditions which occur during the preparation of the polymeric network are not stable or only inadequately stable or, for example, are not available. In this case, for example, compounds which are homologous to or structurally related to the substances to be separated, preferably isosteric, can be employed as template compounds.

The adaptation of the conformation can be carried out here, inter alia, by interaction of the polymer with the template compound. It is also possible, for example, that two or more polymer strands of polymers which are identical to or different from one another are crosslinked and the resulting polymeric structure interacts with the at least one template compound and thus the conformation of the polymeric structure and thus also the conformation of the polymer employed is adapted to the template compound.

It is furthermore possible that, by intramolecular crosslinkage of a polymer strand, a conformation is formed which interacts with the at least one template compound, the conformation of the polymer being adapted to the at least one template compound. Embodiments in which such an intramolecular crosslinking takes place are possible in the context of the present invention in the case of all suitable polymers. Polymers are particularly preferred which have a molar mass of more than 10 000 g/mol, further preferably of more than 30 000 g/mol and particularly preferably of more than 100 000 g/mol.

Furthermore, a preferred aspect of the present invention also includes embodiments in which the adaptation of the conformation is carried out such that, in the absence of the at least one template compound, polymeric structures are synthesized by inter- or intramolecular crosslinking whose conformations are adapted to the at least one template compound by specific selection of the at least one polymer and/or of the at least one crosslinking reagent employed. In this case it is possible, for example, that the steps (ii) and (iii), as mentioned above, can be carried out in one step. In the case of crosslinkage in the absence of the at least one template compound, however, it is also possible that polymeric structures are synthesized which are roughly adapted to the at least one template compound, where a more accurate adaptation can be carried out by further crosslinking steps in the presence or absence of the at least one template compound.

Accordingly, all polymers which can be crosslinked intra- and/or intermolecularly and which can interact per se or after crosslinking with the at least one template compound can be employed in the process according to a preferred aspect of the invention.

In the context of the present invention, the term "interaction" is understood as meaning all suitable covalent and non-covalent interactions.

Possible interactions of the at least one polymer or one polymeric structure employed, which is synthesized, for example, by intra- or intermolecular crosslinking, as described above, with the at least one template compound are, inter alia:

hydrogen bonds;
dipole-dipole interactions;
Van der Waals interactions;
hydrophobic interactions;
charge-transfer interactions, eg. $\pi$-$\pi$ interaction;
ionic interactions;
coordinative bonding, e.g. to transition metals;
combinations of these interactions.

Obviously, covalent bonds between polymer and/or polymeric structure and the at least one template compound are possible. If the polymer network prepared in the process according to the invention is used in, for example, substance separation processes, interactions between polymer and/or polymeric structure and the at least one template compound are particularly preferred, by means of which the at least one template compound is reversibly bonded.

If the at least one polymer employed interacts per se with the at least one template compound, according to the process according to the invention it has at least one functional group by means of which this interaction can be formed. If the conformation of the polymer which is formed by interaction with the at least one template compound is fixed by crosslinkage, it is possible, inter alia, that the crosslinkage takes place via the functional group via which the interaction with the at least one template compound was formed. Preferably, the polymer has at least one further functional group via which the crosslinkage takes place.

The term "functional group", as is used in the context of a preferred aspect of the present invention, accordingly includes all chemical structures via which covalent and/or non-covalent interactions can take place. In particular, hydrocarbon chains and further structural units via which Van der Waals interactions can be formed also come under the term of functional group.

A particularly suitable structure of the polymers employed is accordingly present if the functional groups in the polymer which are capable of interaction are able, according to type and/or number and/or density and/or distribution, to bond a specific template compound. Very particularly suitable polymers are those which are able to bond a specific template compound bi-, tri-, oligo- and/or polyvalently in more than one molecular position. Accordingly, two or more functional groups which are optionally spatially separated by at least one group which is inert to an interaction can be responsible for the interaction.

The term "in the polymer", as is used in the context of the present invention, relates, inter alia, to polymers in which the at least one functional group which is used for the formation of the interaction with the substrates and/or for the crosslinking is present in the polymer strand. The term likewise relates to polymers in which the at least one functional group is present in at least one side chain of the polymer strand, and also to polymers in which at least one type of a functional group is present both in the polymer strand and in at least one side chain of the polymer strand.

Accordingly, in the process according to a preferred aspect of the invention generally both derivatized and non-derivatized polymers can be employed.

The at least one functional group which is needed in the polymer for the formation of the interaction with the at least one template compound and/or for crosslinkage can accordingly already be present in the original polymer and does not necessarily have to be introduced into the polymer by subsequent derivatization. Inter alia, for example, the amino or formyl groups in polyvinylamine or, for example, the hydroxyl or acetyl groups in polyvinyl alcohol may be mentioned by way of example here.

In the process according to a preferred aspect of the invention it is possible, inter alia, to "designate" the receptor-template interaction using made-to-measure receptor groups by derivatization of at least one polymer which is employed in the process in derivatized form. In the context of a preferred aspect of the present invention, the degree of derivatization can be influenced here such that the best possible interaction with the template is achieved. It is likewise possible to designate the adaptation of the conformation of the at least one polymer in the absence of the at least one template compound by specifically introducing certain crosslinking possibilities or interaction possibilities into the polymer, for example by means of the functional groups introduced by derivatization.

If one or more polymers are first derivatized in the process according to a preferred aspect of the invention and then employed in the process according to a preferred aspect of the invention, the derivatization can take place according to all suitable processes, for example processes known from the prior art.

In order to equip polymers which have functional groups with receptor groups and to derivatize them in this way, three routes can be mentioned, inter alia, which are listed in M. Antonietti, S. Heinz, Nachr. Chem. Tech. Lab. 40 (1992) No. 3, pp. 308-314. According to this publication, derivatized polymers are obtainable by means of random polymerization or copolymerization, by means of the preparation of block copolymers and by means of the preparation of surface-functionalized polymer particles. These preparation routes start from derivatized monomers from which the polymer is obtained.

A further possibility of derivatizing polymers is the polymer-analogous reaction of polymers having functional groups with derivatizing compounds.

Polymer derivatizations are carried out, for example, on solid surfaces by heterogeneous reaction. This group includes, inter alia, carrier activation and carrier immobilization, in which a nucleophilic substance is customarily heterogeneously bonded to a polymer, e.g. epoxy polyacrylic ester or BrCN-sepharose, as is described, for example, in P. Mohr, M. Holtzhauer, G. Kaiser, Immunosorption Techniques, Fundamentals and Applications, Akademie Verlag, Berlin (1992), pp. 34-40.

In a preferred embodiment, in the process according to a preferred aspect of the invention (i) a derivatized polymer can be made available which is prepared by reacting a polymer having at least one functional group with at least one activating reagent or a derivative of an activating reagent, where this reaction can take place homogeneously or heterogeneously, preferably homogeneously.

As a rule, the activating reagent is in this case selected such that the at least one functional group of the polymer reacts with the activating reagent during the reaction and is thus improved in its reactivity in a subsequent reaction with a derivatizing agent.

Accordingly, a preferred aspect of the present invention also describes a process in which the reaction product from the polymer having at least one functional group and the activating reagent is reacted with a derivatizing reagent.

In the context of this embodiment of the process according to a preferred aspect of the invention, the polymer having at least one functional group can be reacted simultaneously, i.e. in the sense of a "one-pot reaction" with at least one activated and/or at least one non-activated derivatizing reagent and/or an activating reagent.

By means of this reaction of the activated polymer having at least one functional group with a derivatizing reagent, a desired radical can be introduced into the polymer.

If a polymer was reacted here with different activating reagents, these activated functional groups can have different reactivity to one or more derivatizing reagents. Accordingly, it is possible in the context of the process according to a preferred aspect of the invention to derivatize functional groups selectively in this manner. The term "selective" in this connection means that a polymer which has, for example, two or more functional groups which are different from one another is reacted with, for example, two different activating reagents such that a subsequent reaction with a derivatizing reagent for derivatization takes place mainly to exclusively on the activated functional group(s) which is or are activated with one of these two activating reagents, as a rule on the functional group(s) more reactively activated with respect to the derivatizing reagent.

In the process according to a preferred aspect of the invention, it is furthermore possible to react the activating reagent before the reaction with the polymer having at least one functional group in order then to react this reaction product with the polymer having at least one functional group.

A preferred aspect of the present invention therefore also describes a process, as described above, in which the derivative of the activating reagent is obtained by prior reaction of the activating reagent with a derivatizing reagent.

A further embodiment of the present invention consists in reacting the polymer having at least one functional group with various products from reactions of activating reagents and derivatizing reagents. Thus, for example, a mixture of compounds can be reacted with the polymer, the mixture of reaction products comprising an activating reagent and two or more different derivatizing reagents. A mixture is likewise possible that comprises reaction products of a derivatizing reagent and two or more different activating reagents. Of course, it is also possible, should this be necessary, to employ a mixture which comprises reaction products of two or more different activating reagents and two or more different derivatizing reagents. Obviously, it is also possible in the context of the present invention to react the different reaction products of activating reagent and derivatizing reagent not as a mixture, but individually and in the desired sequence with the polymer having at least one functional group.

Accordingly, a preferred aspect of the present invention also describes a process as described above, in which the polymer having at least one functional group is reacted with at least two different derivatives of an activating reagent and the reactions are carried out successively with one derivative in each case.

Activating reagents which can be employed in principle are all activating reagents known from the literature. The article by P. Mohr, M. Holtzhauer, G. Kaiser already cited above, which in this respect is included completely by way of reference in the context of the present patent application, gives, for example, an overview on a whole series of activating reagents which can be employed for the activation of various functional groups.

In particular, chloroformic acid esters and chloroformic acid esters having electron-withdrawing radicals may be mentioned here.

In particular, a preferred aspect of the present invention describes a process in which the activating reagent is derived from a compound of the following structure (I):

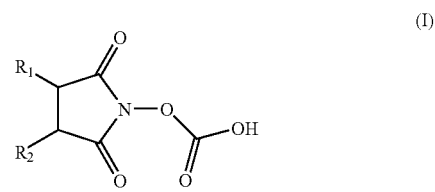

where $R_1$ and $R_2$ are identical or different and can be straight-chain, branched-chain or bridged to give a carbocycle or a heterocycle and are selected such that the activating reagent or the derivative of the activating reagent can be reacted in homogeneous phase with the polymer having at least one functional group.

$R_1$ and $R_2$ here can be, for example, cycloalkyl, cycloalkenyl, alkyl, aryl or aralkyl radicals having up to 30 C atoms.

In a preferred embodiment, a preferred aspect of the present invention describes a process in which the activating reagent is derived from a compound of the following structure (I')

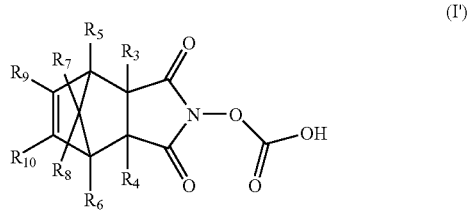

where $R_3$ to $R_{10}$ can be identical or different and can be hydrogen, straight-chain or branched-chain alkyl, aryl, cycloalkyl, heterocyclic and aralkyl radicals having up to 30 C atoms, or else two or more of $R_3$ to $R_{10}$ can in turn be bridged to give a carbocycle or heterocycle and are selected such that the activating reagent or the derivative of the activating reagent can be reacted in homogeneous phase with the polymer having at least one functional group.

A preferred aspect of the present invention further describes a process in which the activating reagent has the following structure (II)

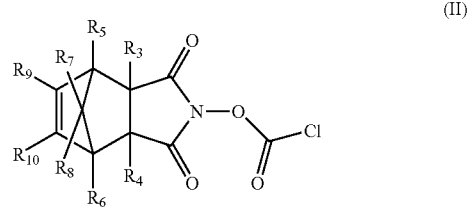

where $R_3$ to $R_{10}$ are as defined above.

In a likewise preferred embodiment, a preferred aspect of the present invention describes a process in which the activating reagent is derived from a compound of the structure (II), as indicated above, where $R_3$ to $R_{10}$ is in each case hydrogen.

The compounds having the structures (I), (I') and (II) can be prepared by all customary processes known from the prior art. Such a process for ONB—Cl is given, for example, in P. Henklein et al., Z. Chem. 9 (1986), p. 329 ff.

Using the activating reagents or the derivatives of activating reagents as described above, all polymers which have at least one functional group which is reactive with respect to the activating reagents can in principle be reacted.

Very generally, polymers which have as at least one functional group a group which has at least one nucleophilic unit are employed in the process according to the invention.

Preferred functional groups of the polymer having at least one functional group which may be mentioned are, inter alia, OH groups, optionally substituted amine groups, SH groups, $OSO_3H$ groups, $SO_3H$ groups, $OPO_3H_2$ groups, $OPO_3HR_{11}$ groups, $PO_3H_2$ groups, $PO_3HR_{11}$ groups, COOH groups and mixtures of two or more thereof, where $R_{11}$ in each case is selected such that the activating reagent or the derivative of the activating reagent can be reacted with the polymer having at least one functional group in homogeneous and/or heterogeneous phase. Likewise, the polymers having at least one functional group can also contain further polar groups, for example —CN.

Both natural and synthetic polymers can be employed as the polymer having at least one functional group. Possible restrictions in the selection of the polymers only result in that the reaction of the polymer is performed in homogeneous phase in the context of the process according to the invention and from the later intended use of the derivatized polymer.

In the context of this invention, the term "polymer" here obviously likewise includes higher molecular weight compounds which are designated in polymer chemistry as "oligomers".

Without wishing to be restricted to certain polymers, the following may be mentioned, inter alia, as possible polymers having at least one functional group:
polysaccharides, e.g. cellulose, amylose and dextrans;
oligosaccharides, e.g. cyclodextrins;
chitosan;
polyvinyl alcohol, poly-Thr, poly-Ser;
polyethyleneimine, polyallylamine, polyvinylamine, polyvinylimidazole, polyaniline, polypyrrole, poly-Lys;
poly(meth)acrylic acid (esters), polyitaconic acid, poly-Asp;
poly-Cys.

Likewise, in principle not only homopolymers, but also copolymers and in particular block copolymers and random copolymers, are suitable to be employed in the present process. Here, both copolymers having non-functionalized components such as, for example, co-styrene or co-ethylene or alternatively copolymers such as, for example, co-pyrrolidone may be mentioned.

If the polymers in the process according to the invention are derivatized in homogeneous liquid phase, then, in order to achieve optimum solubility, preferably mixed-functional or alternatively prederivatized polymers are employed. Examples of these which may be mentioned are, for example:
partially or completely alkylated or acylated cellulose;
polyvinyl acetate/polyvinyl alcohol;
polyvinyl ether/polyvinyl alcohol;
N-butylpolyvinylamine/polyvinylamine.

Likewise, polymer/copolymer mixtures can also be used. All suitable polymer/copolymer mixtures can be employed here, for example mixtures of the polymers and copolymers already mentioned above, where, inter alia, the following, for example, are to be mentioned here:
poly(acrylic acid)/co-vinyl acetate;
polyvinyl alcohol/co-ethylene;
polyoxymethylene/co-ethylene;
modified polystyrenes, e.g. copolymers of styrene with (meth)acrylic acid (esters);
polyvinylpyrrolidone and its copolymers with poly(meth) acrylates.

All of these abovementioned polymers, which are accessible to derivatization, can obviously also be employed in underivatized form in the process according to the invention.

If, as described above, the polymer having at least one functional group is reacted with an activating reagent such as a compound of the structure (II), then, as likewise described above, this reaction product can be reacted with a derivatizing reagent.

Here, in principle, all reagents which can react with the activated polymer and lead directly or indirectly to the desired derivatized polymer can be used. Inter alia, compounds which have at least one nucleophilic group are employed in the process according to the invention as derivatizing reagents.

For example, derivatizing reagents are used which have the general composition $HY\text{—}R_{12}$. Here, Y is, for example, O, NH, $NR_{13}$ or S, where $R_{12}$ and $R_{13}$ can generally be freely selected. For example, they are an alkyl or aryl radical which is optionally suitably substituted.

In addition, it is also possible to react the activated polymer with nucleophilic chiral compounds. Examples of such chiral nucleophiles which may be mentioned are, for example:

borneol, (−)-menthol, (−)-ephedrine, α-phenylethylamine, adrenaline, dopamine.

A further possibility is to react the activated polymer with a mono- or polyhydric alcohol or thiol containing an amino group in the process according to a preferred aspect of the invention. If the polymer comprising at least one functional group is activated, for example, with ONB—Cl, the mono- or polyhydric alcohol containing the amino group or the mono- or polyhydric thiol containing the amino group reacts selectively with the amino group. The OH or SH groups thus introduced into the polymer can then be activated again in a further step with, for example, one of the activating reagents described above, whereby chain extensions and branchings are facilitated, depending on the functionality of the alcohols or thiols originally employed.

In another embodiment of the process according to a preferred aspect of the invention already described above, the polymer having at least one functional group is reacted with an activated derivatizing reagent, the latter being obtained from the reaction of an activating reagent with the derivatizing reagent.

In the process according to a preferred aspect of the invention, activated derivatives of amines, alcohols, thiols, carboxylic acids, sulphonic acids, sulphates, phosphates or phosphonic acids are preferably reacted with the polymer having at least one functional group, where, in turn in a preferred embodiment, the compounds are activated with ONB—Cl.

Inter alia, these activated derivatizing reagents which can be reacted with the polymer having at least one functional group thus have the following general structures (III) to (IX):

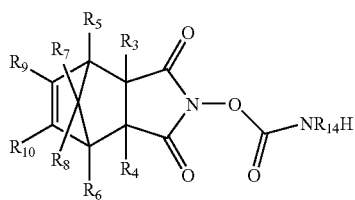 (III)

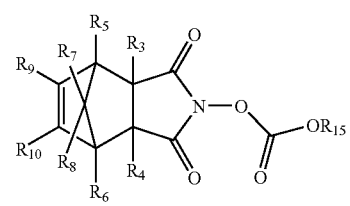 (IV)

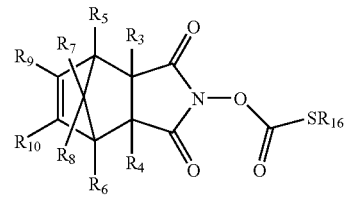 (V)

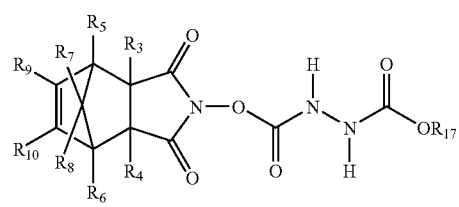 (VI)

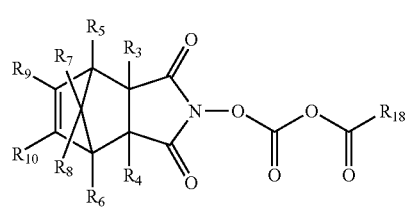 (VII)

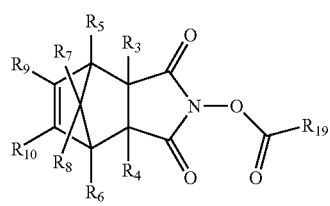 (VIII)

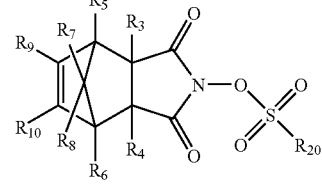 (IX)

where $R_3$ to $R_{10}$ are as defined above and $R_{14}$ to $R_{20}$ are in general subject to no restrictions, for example can also have chirality, and in the process according to the invention are selected such that the reaction with the polymer having at least one functional group can be carried out in homogeneous phase. Here, the substituents $R_{14}$ to $R_{20}$ as a rule are selected depending on the desired interaction with the substrate. Here, $R_{14}$ to $R_{20}$ can be identical or different and are radicals containing hydrogen, a straight-chain or branched-chain alkyl, aryl or aralkyl radical having up to 30 C atoms or corresponding heteroatoms.

Likewise, polyhydric amines, alcohols, thiols, carboxylic acids, sulphonic acids, sulphates, phosphates or phosphonic acids can be reacted with an activating reagent and this reaction product can be reacted with the polymer having at least one functional group, where here, in particular, polyols may be mentioned.

Obviously it is also possible to activate derivatizing reagents which have two or more different types of the abovementioned functional groups and to react them with the polymer having at least one functional group. Examples which may be mentioned here, inter alia, are, for example, aminoalcohols.

In the context of a preferred aspect of the present invention, such polyhydric derivatizing reagents can selectively be partially or completely activated using an activating reagent and reacted with the polymer having at least one functional group.

The reaction of the polymer having at least one functional group with an activated, polyhydric derivatizing reagent can also be used in the process according to a preferred aspect of the invention for polymer crosslinking and further for polymer stabilization and/or for polymer branching, in addition to the fact that a suitable polymer according to (i) is made available.

Both the reaction of the polymer having at least one functional group with an activated derivatizing reagent and the reaction of the polymer having at least one functional group with an activating reagent and subsequent reaction of the product with a derivatizing reagent by the process according to a preferred aspect of the invention make it possible to prepare polymer derivatives which have very different spatial arrangements and accordingly can be used for a large number of applications in which this spatial arrangement is of crucial importance.

Thus it is possible, for example, to realise arrangements which are constructed as hairy rods, comb polymers, nets, baskets, dishes, tubes, funnels or cages.

In a likewise preferred embodiment, a preferred aspect of the present invention describes a derivative of the type under discussion here, which has at least one receptor group which has a bonding unit decisive for the bonding of a biological or synthetic chemical substrate.

A made-to-measure derivative of this type for biological substrates then has corresponding receptor groups which have, for example, structures also occurring in nature or parts of structures of this type responsible for bonding, which can then interact with a biological substrate. Here in particular, for example, enzyme, amino acid, peptide, sugar, amino sugar, sugar acid and oligosaccharide groups or derivatives thereof may be mentioned. It is essential for the above receptor groups that the principle of bonding of a receptor with a substrate occurring in nature is exclusively retained here, such that, for example, synthetic enzymes, binding domains of antibodies or other physiological epitopes can be obtained by means of this embodiment. Inter alia, in the context of the present invention a derivative of a polymer having at least three functional groups is selected here, as described above, in which at least one receptor group is an amino acid residue or an amino acid derivative residue. Possible amino acids are, for example:

- amino acids having aliphatic residues such as glycine, alanine, valine, leucine, isoleucine;
- amino acids having an aliphatic side chain which includes one or more hydroxyl groups, such as serine, threonine;
- amino acids which have an aromatic side chain, such as phenylalanine, tyrosine, tryptophan;
- amino acids which include basic side chains, such as lysine, arginine, histidine;
- amino acids which have acidic side chains, such as aspartic acid, glutamic acid;
- amino acids which have amide side chains, such as asparagine, glutamine;
- amino acids which have sulphur-containing side chains, such as cysteine, methionine;
- modified amino acids, such as hydroxyproline, γ-carboxylglutamate, O-phosphoserine;
- derivatives of the amino acids mentioned or optionally of further amino acids, for example amino acids esterified on the carboxyl group or optionally the carboxyl groups with, for example, alkyl or aryl radicals which can be optionally suitably substituted.

Instead of the amino acid, the use of one or more di- or oligopeptides is also possible, where in particular homopeptides, which are only synthesized from identical amino acids, may be mentioned. An example of a dipeptide which may be mentioned is, for example, hippuric acid. Furthermore, beta-, gamma- or other structurally isomeric amino acids and peptides derived therefrom such as depsipeptides can also be used.

Very generally, the activating reagents employed in the process according to a preferred aspect of the invention can be compounds of the general structure (X)

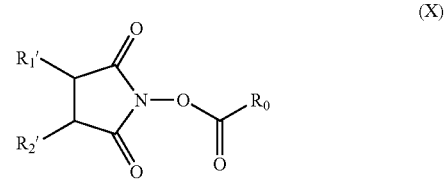

which are characterized in that $R_0$ is a halogen atom or a radical (X')

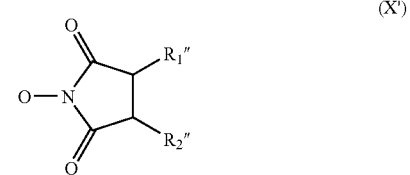

and $R_1'$, $R_2''$ $R_1''$ and $R_2''$ are identical or different and are hydrogen, straight-chain or branched-chain alkyl, aryl, cycloalkyl, heterocyclic or aralkyl radicals having up to 30 C atoms or either $R_1'$ and $R_2'$ or $R_1''$ and $R_2''$ or both $R_1'$ and $R_2'$ and $R_1''$ and $R_2''$ are linked to at least one carbocycle or to at least one heterocycle or to at least one carbocycle and to give at least one heterocycle. In particular, compounds may be mentioned by way of example here which have the following structures $(X_1)$ to $(X_{39})$:

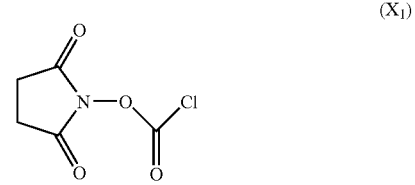

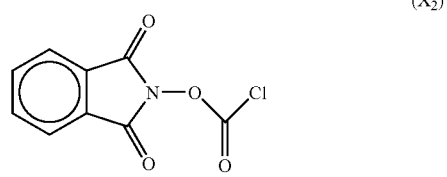

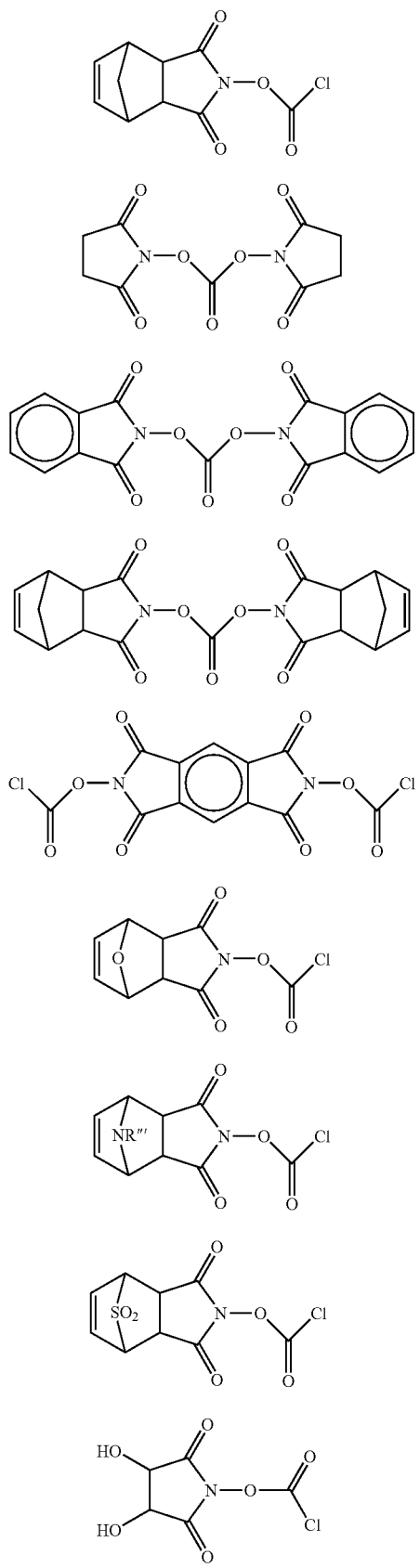
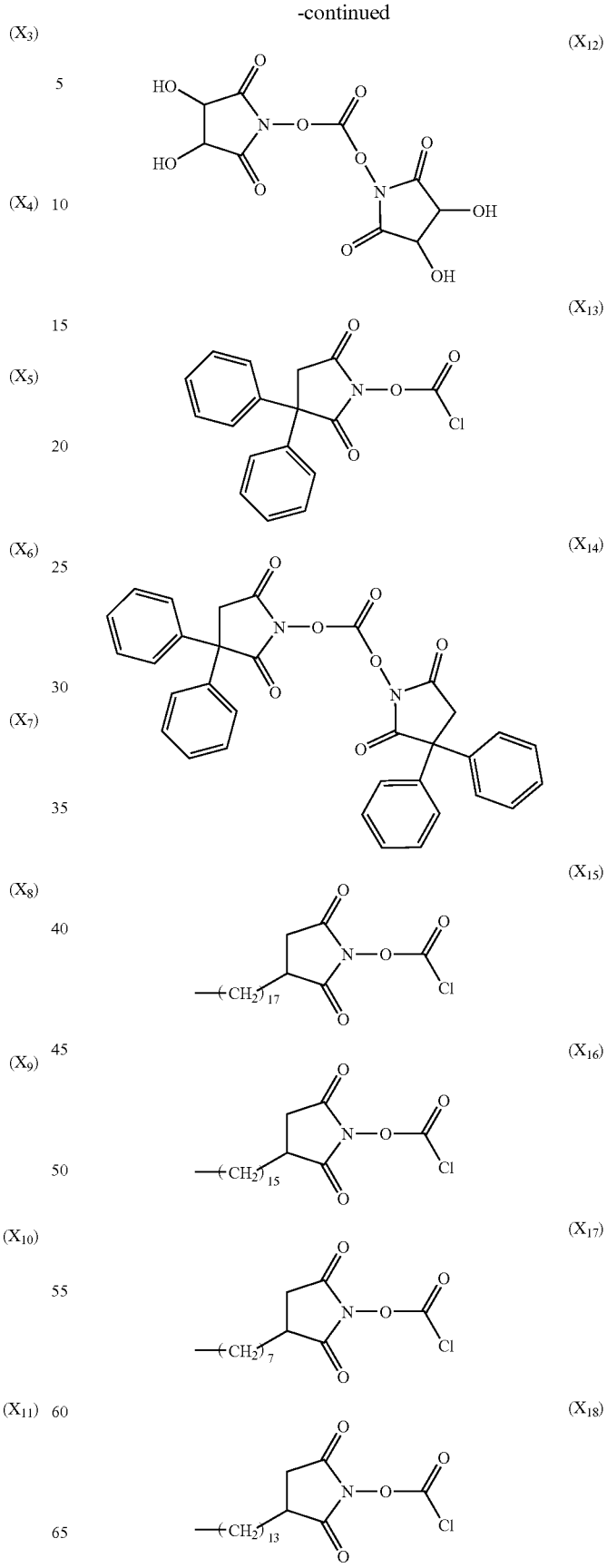

-continued
(X19) 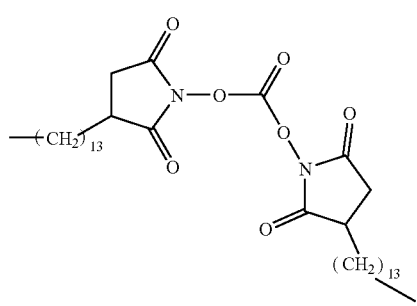
(X20) 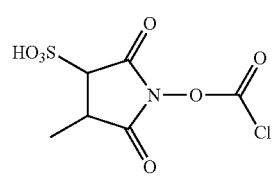
(X21) 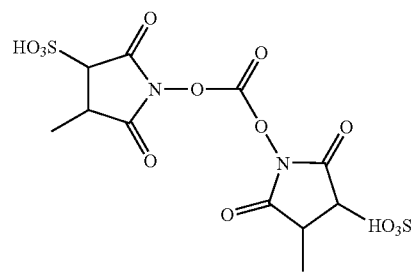
(X22) 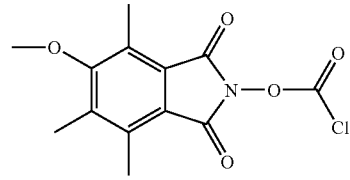
(X23) 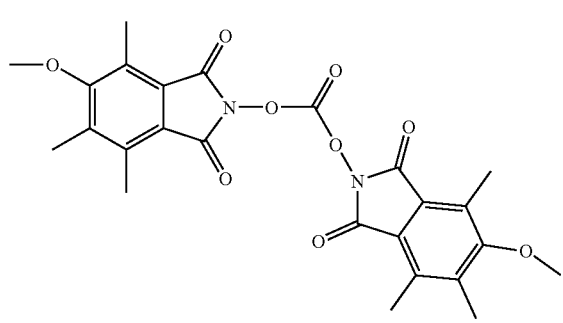
(X24) 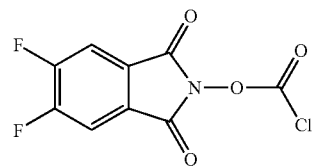
-continued
(X25) 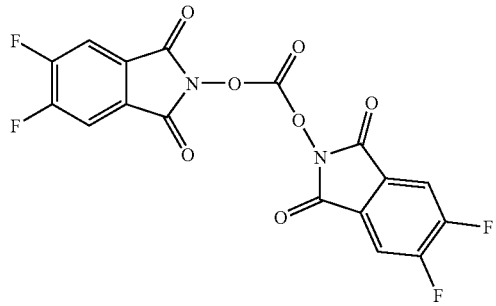
(X26) 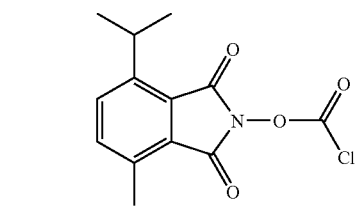
(X27) 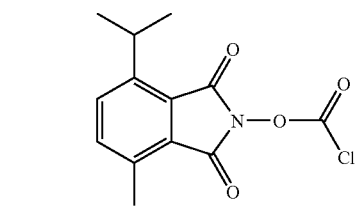
(X28) 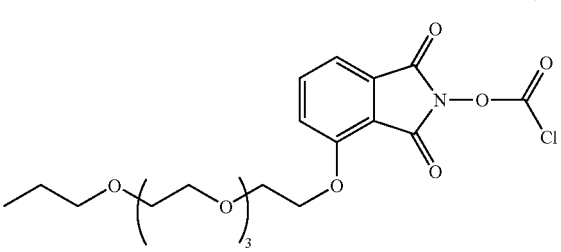
(X29) 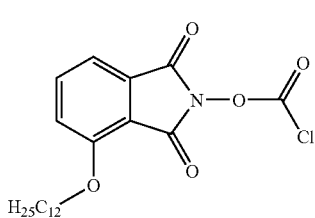

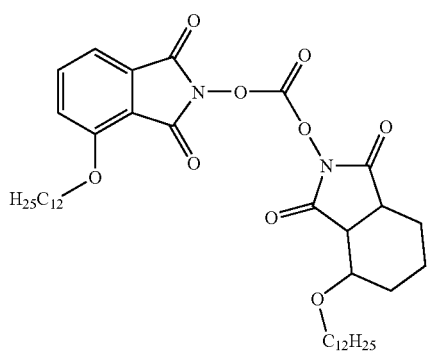
(X₃₀)

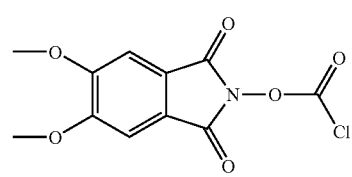
(X₃₁)

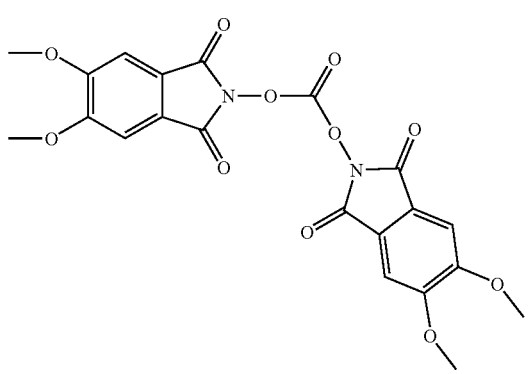
(X₃₂)

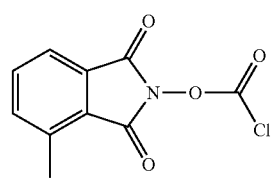
(X₃₃)

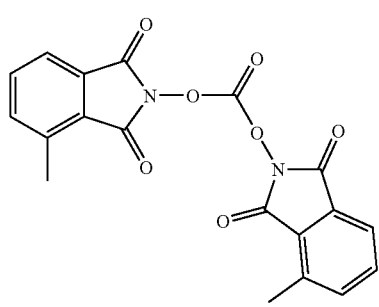
(X₃₄)

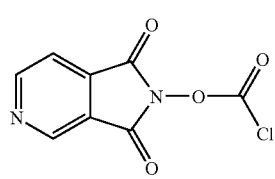
(X₃₅)

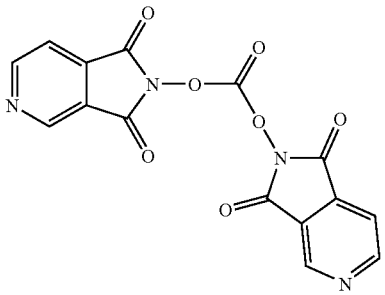
(X₃₆)

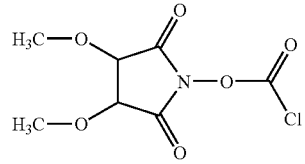
(X₃₇)

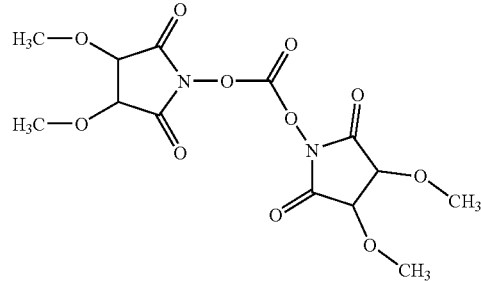
(X₃₈)

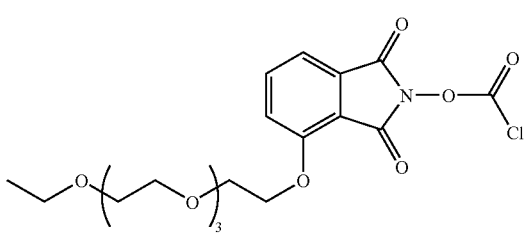
(X₃₉)

where R'" is hydrogen or a straight-chain or branched-chain, optionally substituted alkyl, aryl or aralkyl radical having up to 30 C atoms.

In the context of a preferred aspect of the present invention, the crosslinkage according to (iii) can be achieved, for example, in that two or more strands of derivatized or underivatized polymer are reacted directly with one another. This can be achieved, for example, in that the groups introduced by derivatization are constituted such that covalent and/or non-covalent bonds can be connected between these groups. Very generally, it is possible that these covalent and/or non-covalent bonds are formed between groups which are attached to one polymer strand, and/or are formed between groups which are attached to two or more polymer strands, such that two or more polymer strands can be connected to one another via one or more sites by crosslinkage.

Obviously, the bonding of the at least one polymer to the carrier material can also take place via functional groups which are present in the polymer itself or have been introduced into the polymer by suitable derivatization, as described above.

Likewise, it is also possible to employ for crosslinkage one or more suitable crosslinking reagents with which, as described above, groups within a polymer strand and/or groups which are attached to a number of strands of optionally different, optionally derivatized polymers can be crosslinked in a covalent and/or non-covalent manner.

Inter alia, it is possible here, even in the selection of the at least one polymer, to design its composition for later crosslinkage. Furthermore, it is in particular possible in the context of the present invention to design the derivatizing reagent with respect to its chemical composition, inter alia, with regard to later crosslinkage even during derivatization. In particular, the derivatizing reagent can contain groups which are selective for covalent and/or non-covalent crosslinkage.

Possible crosslinking reagents in principle are all suitable compounds known from the prior art. Accordingly, the crosslinkage can be carried out, for example, in a covalently reversible manner, in a covalently irreversible manner or in a non-covalent manner, where in the case of crosslinkage in a non-covalent manner, for example, crosslinkages via ionic interaction or via charge-transfer interaction may be mentioned. Crosslinking processes or reagents of this type are described, inter alia, in Han, K. K., et al., Int. J. Biochem., 16, 129 (1984), Ji, T. H., et al., Meth. Enzymol., 91, 580 (1983) and Means, G. and Feeney, R. E. Bioconj. Chem., 1,2 (1990).

With respect to non-covalent crosslinkage, an example which may be mentioned is, for example, crosslinkage by shifting the pH, when at least one basic and at least one acidic group are crosslinked with one another. Likewise, for example, non-covalent crosslinkage can take place when, in the case where two basic groups of, for example, polyallylamine are crosslinked with one another, a dibasic acid such as glutaric acid is added, or in the case where two acidic groups of, for example, polyacrylic acid are to be crosslinked with one another, a bifunctional such as ethylenediamine is added. Likewise, a non-covalent crosslinkage can be formed by way of example by complex-forming metal ions or by metal complexes with free coordination sites. Non-covalent crosslinkage is preferably reversible and can therefore be employed in a preferred use of the polymeric networks prepared according to the invention for rapid systematic interaction studies. Very generally, with respect to non-covalent crosslinkage, reference can be made to all possible interactions which have already been presented above with respect to the interaction between template and polymeric structure.

With respect to covalently reversible attachment, inter alia, bonding via disulphide bridges or via labile esters or imines such as Schiff's bases or enamines may be mentioned by way of example.

The chain length of the crosslinking reagents is in general arbitrary and can be adapted to the requirements of the particular process. Preferably, the chain length in the case of crosslinking reagents which have a carbon chain is in the range from 2 to 24 C atoms, preferably in the range from 2 to 12 C atoms and particularly preferably in the range from 2 to 8 C atoms.

Crosslinking reagents which may be mentioned which can lead to covalently irreversible crosslinkage are, inter alia, bi- or polyfunctional compounds such as diols, diamines or dicarboxylic acids. Here, for example, bifunctional-crosslinkers are reacted with the activated polymer derivative or the at least bifunctional activated crosslinking reagent is reacted with the non-activated polymer derivative. A covalently reversible crosslinkage can be realized, for example, by connecting a sulphur-sulphur bond to a disulphide bridge between two groups attached to one or two polymer strands or by formation of a Schiff's base. Crosslinking via ionic interaction can take place, for example, via two radicals, of which one, as a structural unit, has a quaternary ammonium ion and the other has, as a structural unit, for example —COO$^-$ or —SO$_3^-$ A crosslinkage via hydrogen bridges can be formed, for example, between two complementary base pairs, for example via the following structure:

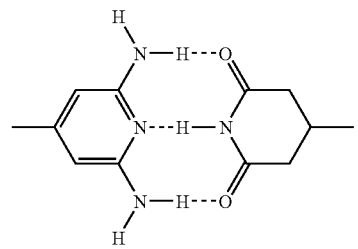

Very generally, polymers to be crosslinked non-covalently can be synthesized in a complementary manner with respect to the crosslinking sites, structural units complementary to one another being, for example, acid/triamine or uracil/melamine. Likewise, in the case of non-covalent crosslinkage the crosslinking reagent can be complementary to the crosslinking sites on the polymer strand. An example of this which may be mentioned would be, for example, an amine group on the polymer strand and a dicarboxylic acid as a crosslinking reagent.

It is necessary in the context of the process according to a preferred aspect of the invention, with respect to a crosslinking step, to activate at least one of the functional groups which are involved in the crosslinkage, thus this is essentially possible according to all processes which are known from the prior art. In particular, the activation of a functional group can be carried out according to a process as is described in detail above in the activation and derivatization of polymers.

If, in the process according to a preferred aspect of the invention, the crosslinkage takes place via the use of at least one crosslinking reagent, this crosslinking reagent can in particular be a condensation compound which is prepared by reaction of at least one functional group of a first low molecular weight compound having at least two functional groups with at least one functional group of at least one further second low molecular weight compound having at least two functional groups, which can be identical to the first or different from the first low molecular weight compound, with obtainment of a condensation compound, the process being characterized in that at least one of the functional groups involved in this reaction has been activated before the reaction by reaction with a compound of the structure (X)

(XI$_1$)

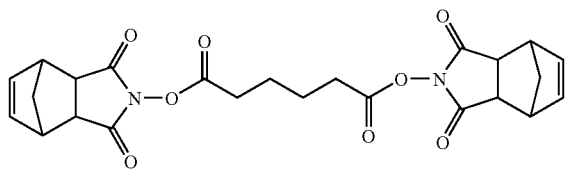

as defined above.

(Activated) crosslinking reagents which may be mentioned are, by way of example, compounds of the following structures (XI$_1$) to (XI$_{17}$) mentioned below;
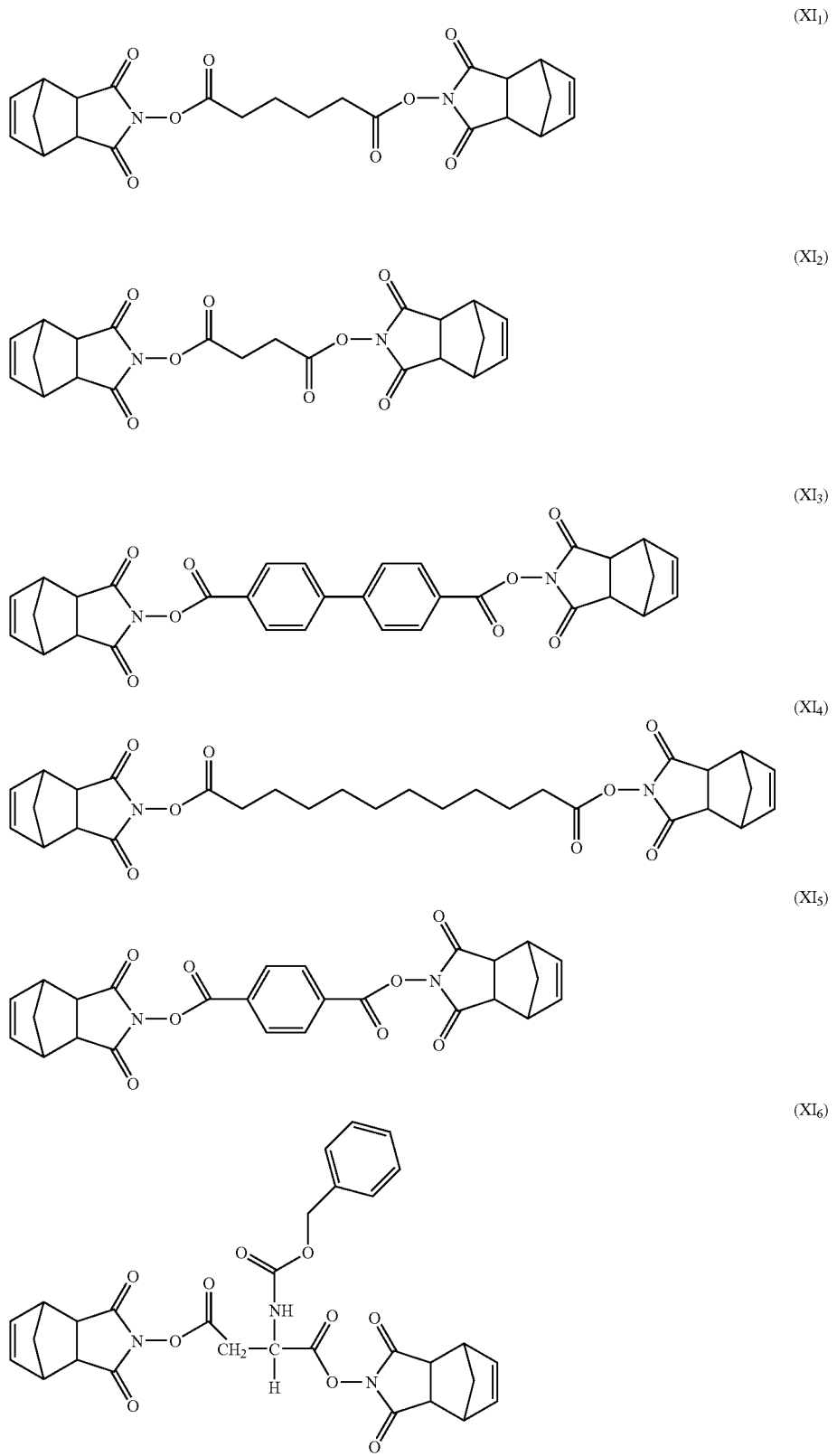

-continued
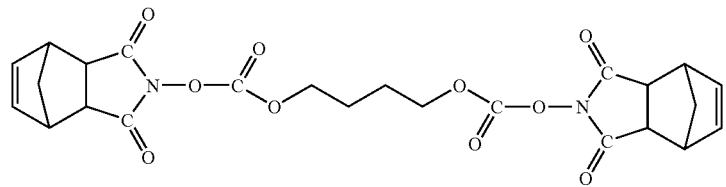
(XI₇)
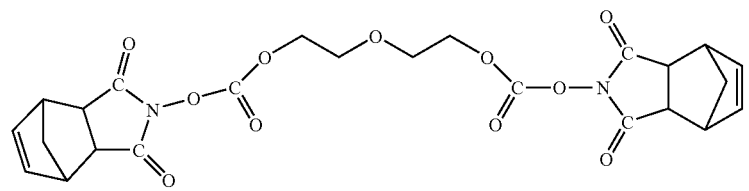
(XI₈)
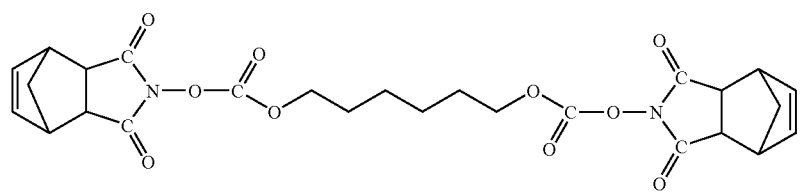
(XI₉)
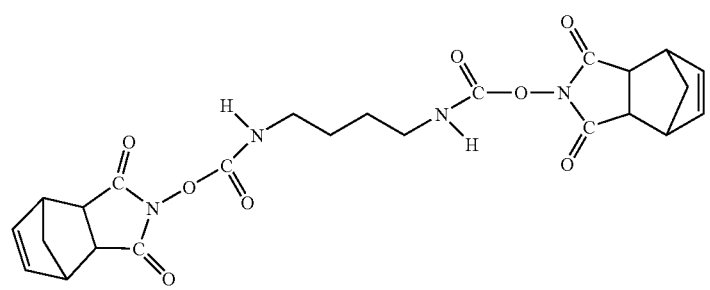
(XI₁₀)
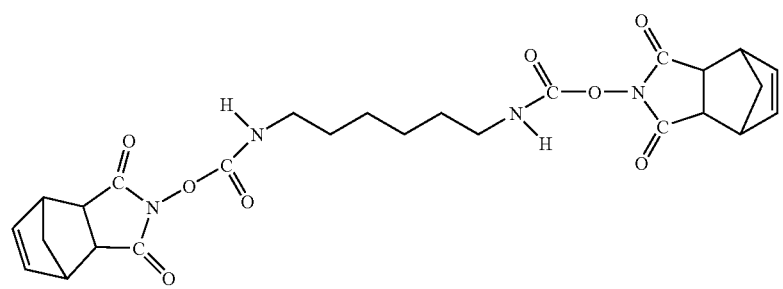
(XI₁₁)
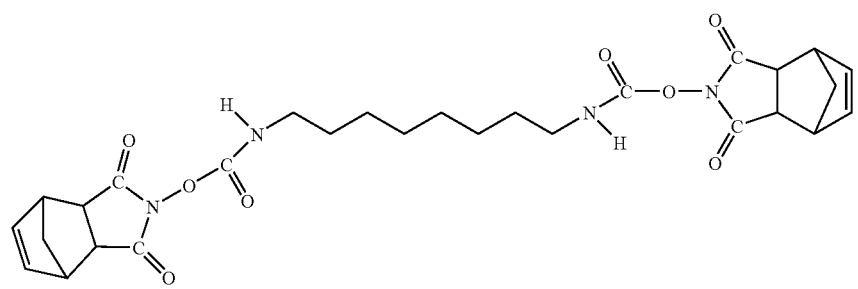
(XI₁₂)

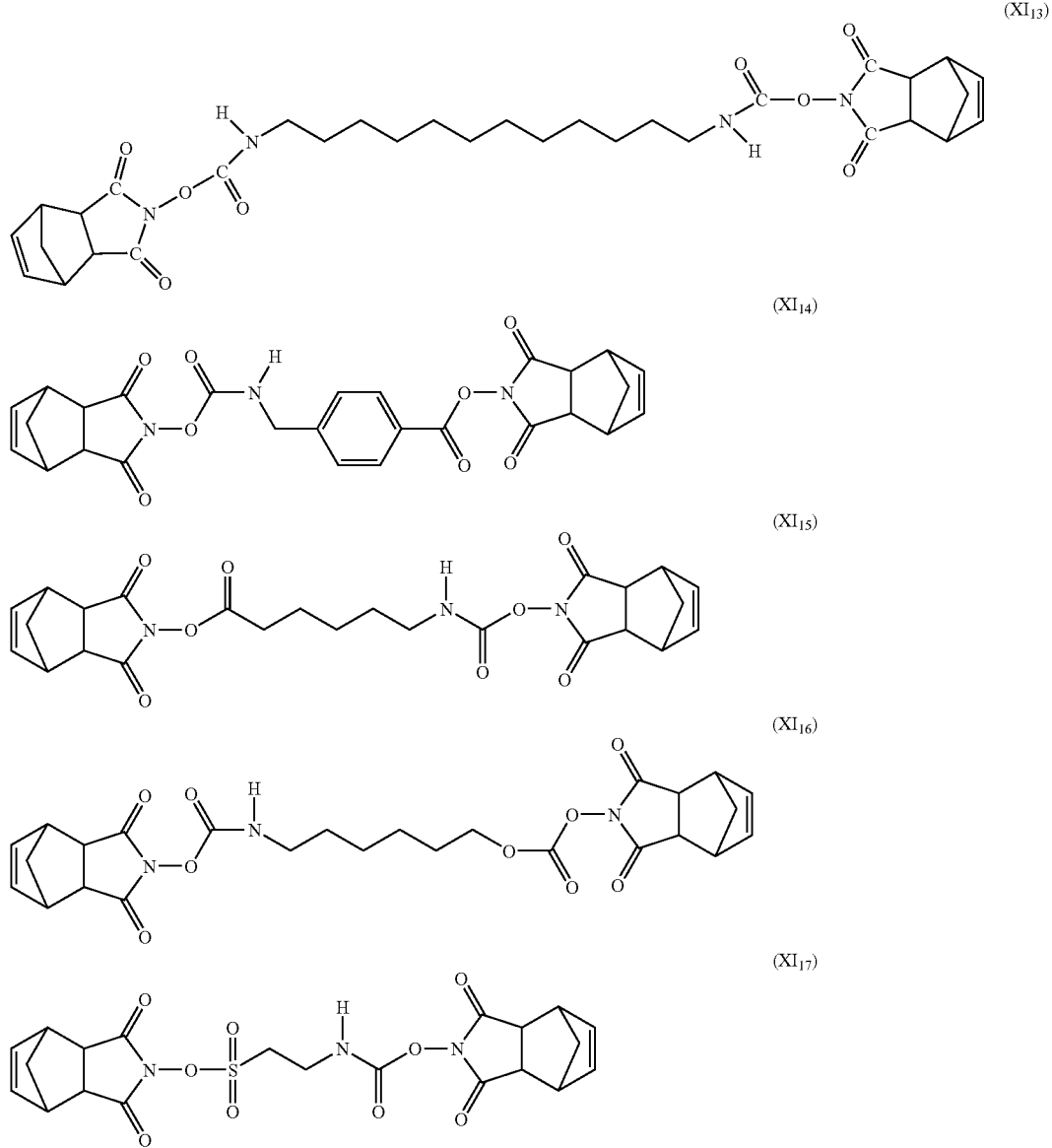
An example of a crosslinking reagent to be used according to a preferred aspect of the invention which may be mentioned below is a dimeric crosslinker which is prepared from phenylalanine and leucine by the process described above:
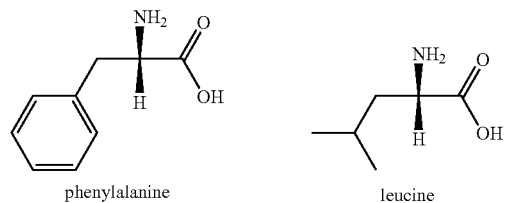

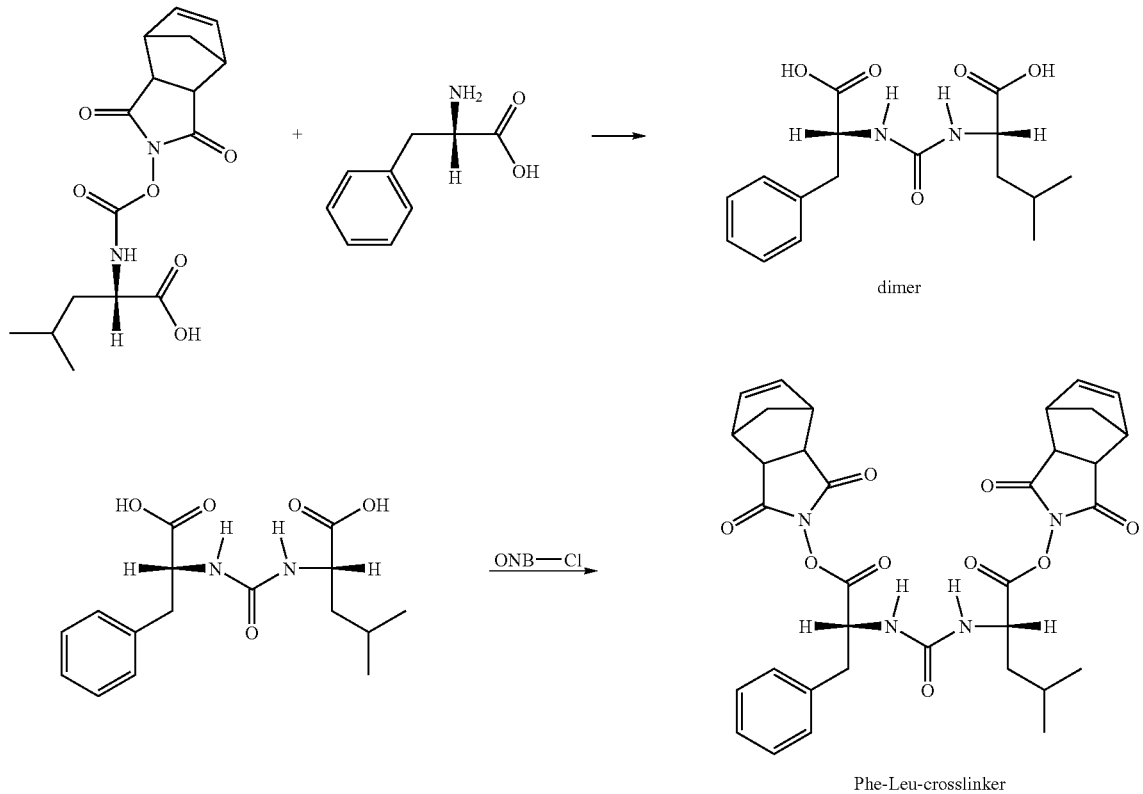
dimer
Phe-Leu-crosslinker
Examples for the synthesis of a condensation compound to be used as a crosslinking reagent by the process according to the invention which may be mentioned are the following reaction routes (A) and (B), in which the radical BNO represents the following structural unit (XII):
(XII)
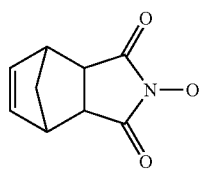
Reaction route (A):
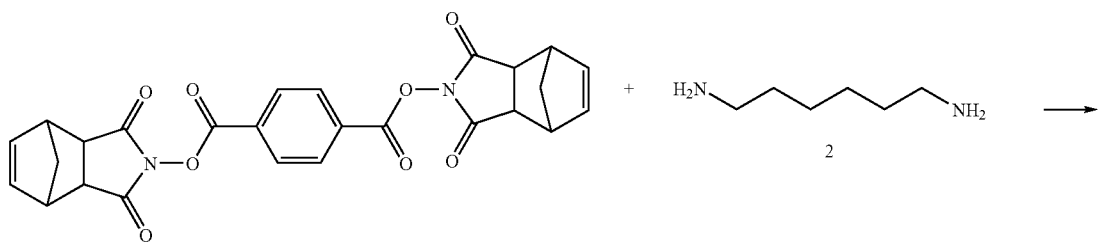

-continued
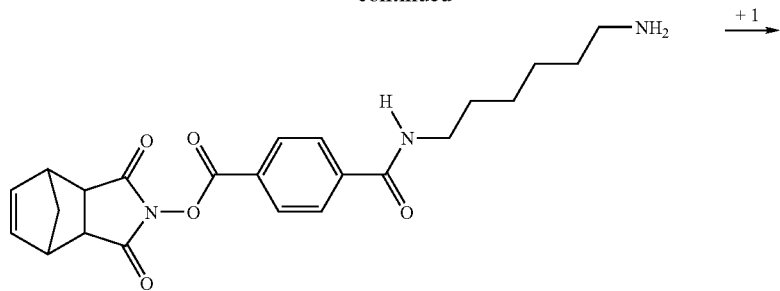
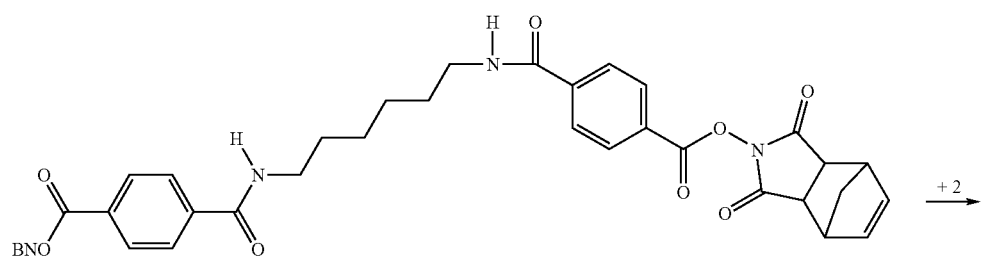
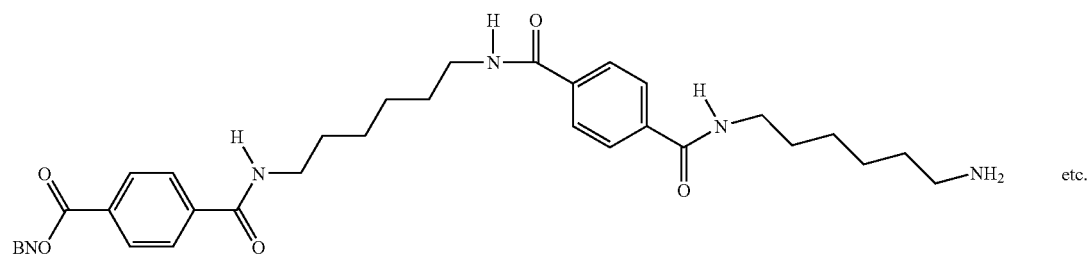
40
Reaction route (B):
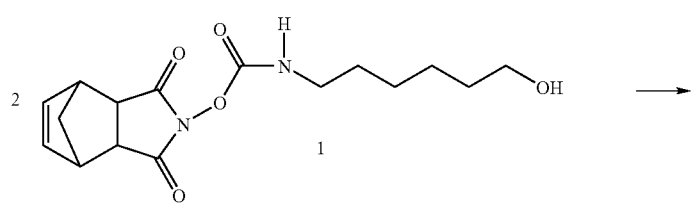
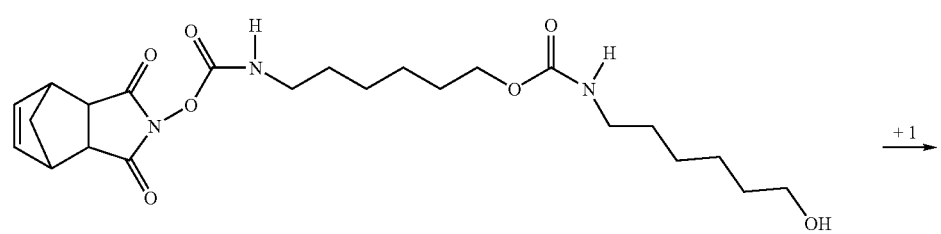

-continued

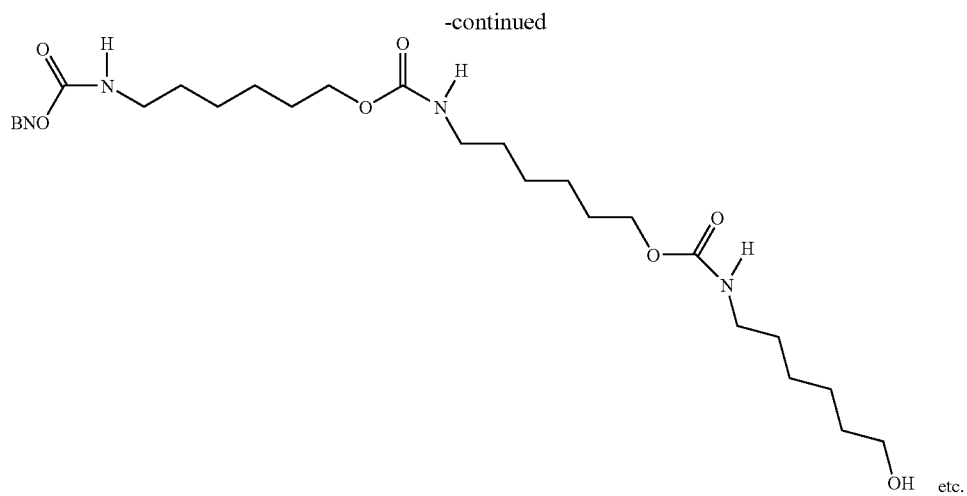

etc.

By means of this process, in which activated or non-activated crosslinking reagents can be prepared, it is of course also possible specifically to prepare polymers which can be employed in the process according to a preferred aspect of the invention and whose conformation can be adapted to at least one template compound. It is possible here that by means of this process, in which a condensation compound is synthesized, a polymer is prepared which is derivatized by the process already described above. Likewise, it is also possible to prepare an already derivatized polymer.

Very generally, in the case of covalent crosslinkage, inter alia, ester, amide, carbonate, hydrazide, urethane or urea compounds or thio-analogous or nitrogen-homologous bonds can be formed.

In a preferred embodiment of the process according to a preferred aspect of the invention, the conformation of at least one of the polymers is adapted in the presence of at least one of the template compounds according to (ii).

Accordingly, a preferred aspect of the present invention relates to a process such as described above, characterized in that the adaptation according to (ii) is carried out in the presence of at least one of the template compounds.

Inter alia, it is possible here to dissolve or to suspend the at least one polymer in one or more suitable solvents and to mix it together with the at least one template compound.

Inter alia, at the same time it is possible to add the at least one polymer to a solution in which the at least one template compound is present dissolved in at least one solvent, where the template compound can also be present in suspended form. Microparticles, for example, may be mentioned as a template compound which can be present in suspended form.

Inter alia, it is further possible to add at least one template compound to a solution in which the at least one polymer is present in dissolved or suspended form in at least one solvent.

Obviously, two or more solutions can also be mixed together, where in at least one solution the at least one polymer is present in dissolved or suspended form and in at least one further solution the at least one template compound is present in dissolved or suspended form.

If two or more polymers which are different from one another and/or two or more different template compounds are employed, each polymer and/or each template compound can be dissolved or suspended separately in one or more suitable solvents and the individual solutions and/or suspensions can be mixed together.

In this connection, embodiments are also possible in which a solution is employed which contains two or more solvents, in which the at least one polymer and/or the at least one template compound are both present in dissolved or in suspended form.

Obviously, it is also possible to start from a template compound which is already present bonded to at least one polymer, for example in the form of a complex or covalently, preferably covalently reversibly bonded. At the same time, the polymer to which the template compound is bonded can be a polymer whose conformation is adapted to this or another template compound in the further process. It is likewise possible to introduce the template compound into the process via this polymer, but the conformation of the polymer is not adapted in the further process to this or another template compound, the polymer remaining in the polymeric network or being removed from the polymeric network by a suitable process.

In one embodiment of the process according to a preferred aspect of the invention, at least one conformation of the at least one polymer which is formed in the solution or in the suspension or in solution and suspension in the presence of the at least one template compound is fixed by crosslinkage. All suitable methods are possible as regards the crosslinkage.

In one embodiment of the process according to a preferred aspect of the invention, one or more crosslinking reagents are added to the solution or the suspension or the solution and suspension.

In a further embodiment of the process according to a preferred aspect of the invention, the crosslinkage is carried out such that one or more covalent or non-covalent or covalent and non-covalent bonds are formed between at least one functional group of at least one polymer and one or more functional groups of at least one further polymer. In this case, the reaction conditions are preferably to be selected such that firstly the conformation of at least one of the polymers is adapted to at least one of the template compounds and the preferred conformation obtained is fixed by crosslinkage by specific choice of the reaction conditions.

The functional groups of the respective polymers between which the bonds are formed can in this case themselves be present in the respective polymer strand. Likewise, it is also possible that at least one of the functional groups involved is a constituent of one or more side chains of the respective polymer. Likewise, at least one side chain of at least one of the polymers involved can also have two or more functional groups which are capable of the formation of the covalent or non-covalent bonds.

Obviously, process embodiments are also possible in which two or more functional groups of the polymers involved, which can be identical to or different from one another, react directly with one another intra- or intermolecularly with formation of at least one covalent or non-covalent bond and two or more functional groups of the polymers involved, which can likewise be identical to or different from one another, are intra- or intermolecularly crosslinked via at least one crosslinking reagent.

Obviously, a preferred aspect of the present invention also comprises embodiments in which, for example, at least two similar or different crosslinking reagents are first reacted with one another with the formation of at least one covalent and/or non-covalent bond and with obtainment of a new crosslinking reagent. The new crosslinking reagent formed can then either be reacted with firstly at least one functional group of at least one polymer and then with at least one further functional group of at least one further polymer. Likewise, these reactions of the new crosslinking reagent can also proceed simultaneously. Obviously, the present invention also includes embodiments in which the adaptation according to (ii) takes place via the fixing according to (iii), such that in this case (ii) and (iii) are to be seen as at least one joint step.

The crosslinkage via the reactions between two or more functional groups with or without crosslinking reagent can obviously take place both intra- and intermolecularly. Accordingly, a preferred aspect of the present invention also includes embodiments in which exclusively intramolecular or exclusively intermolecular crosslinkages take place. A preferred aspect of the present invention further includes processes in which crosslinking is carried out both intra- and intermolecularly, wherein the case in which two or more different polymers are employed, the intermolecular crosslinkages take place exclusively between similar polymers or exclusively between different polymers or between both similar and different polymers.

In a likewise preferred embodiment of the process according to a preferred aspect of the invention, the adaptation of the conformation of the at least one polymer and the attachment of the at least one preferred conformation obtained take place together.

This is realizable, for example, in that the at least one crosslinking reagent is brought into contact with the at least one polymer together with the at least one template compound.

If the crosslinkage is carried out without crosslinking reagents, it is, for example, possible to select the reaction conditions such that the adaptation of the conformation of at least one of the polymers and the crosslinkage take place together.

Very generally, it is possible for at least one of the crosslinking reagents employed to have at least one functional group which is not used for the formation of the covalent or non-covalent bonds which lead to the crosslinkage of the polymers. With respect to this at least one functional group, it is furthermore possible for this to interact with at least one of the template compounds. Thus the process according to the invention accordingly also includes embodiments in which, in addition to at least one polymer, at least one crosslinking reagent also interacts with at least one template compound. Accordingly, it is also possible in the context of the present invention to adapt the conformation of at least one of the polymers to the at least one template compound by interacting both the polymer and the crosslinking reagent, which the polymer crosslinks intermolecularly, with a further polymer or which the polymer intramolecularly crosslinks with the at least one template compound.

The preferred conformation obtained according to (ii) and fixed according to (iii) can thus also be influenced by the crosslinking reagent, where, inter alia, embodiments are also possible according to which a preferred conformation is synthesized such that crosslinking reagent, polymer and template compound interact with one another before attachment.

In a preferred embodiment of the process according to a preferred aspect of the invention, a procedure is used here in which crosslinking reagent, polymer and template compound are first mixed together at low temperature, preferably in the range from 0 to −70° C., such that the interactions are developed, but the attachment by crosslinkage is largely suppressed. In a further step, the temperature is then increased in such a way that attachment takes place.

In the context of the process according to a preferred aspect of the invention, it is moreover also possible that the preferred conformation according to (ii) only results from interaction of at least one of the crosslinking reagents with the at least one template compound. It is accordingly possible, inter alia, that at least one crosslinking reagent first reacts with at least one polymer with formation of at least one covalent or non-covalent bond, and simultaneously or thereafter interacts with at least one of the template compounds, whereby a preferred conformation of the reaction product of crosslinking reagent and polymer is formed, and this preferred conformation is attached by reaction of the reaction product of crosslinking reagent and polymer with a further polymer or by intramolecular crosslinkage.

A preferred aspect of the present invention therefore also describes a process, as described above, which is characterized in that the preferred conformation according to (ii) is influenced by interaction of at least one crosslinking reagent with at least one template compound.

Of course, it is also possible for the preferred conformation to result from the fact that, by means of the reaction of two or more functional groups which can be constituents of one or more side groups of one or more polymers, a structure results which interacts with at least one template compound in such a way that a preferred conformation results which is attached by crosslinkage with at least one crosslinking reagent or by reaction of at least two functional groups of the at least one polymer which contains the preferred conformation.

In a further preferred embodiment, in the context of the process according to a preferred aspect of the invention the adaptation of the conformation according to (ii) takes place in two or more steps.

Accordingly, a preferred aspect of the present invention also relates to a process, as described above, characterized in that the adaptation of the conformation of the at least one polymer takes place in at least two steps.

Inter alia, it is possible, for example, in this respect to bring at least one polymer into contact with at least one template compound in a first step according to a process, as described in detail above, and thereby to deform the conformation of the at least one polymer. In a second step, for example, at least one further template compound, which is different, for example, from the at least one template compound added in the first step, can then be added. It is thereby also possible to adapt the conformation of the at least one polymer to the at least second template compound.

Likewise, it is possible that at least two polymers which are different from one another are employed and, by addition of the at least one template compound in a first step, the conformation of a polymer is adapted to the at least one first template compound, and by addition of at least one further template compound in a second step the configuration of the other polymer is adapted to the at least one further template compound.

It is likewise possible to employ more than two polymers which are different from one another and, in one step in each case, to adapt the conformation of a polymer to the at least one template compound added in one step in each case.

Inter alia, it is possible in this connection to employ a number of polymers which are different from one another and by specific choice of the reaction conditions to adapt the conformation of a first polymer to a template compound in one step and to adapt the conformation of a polymer which is different from the first to the same template compound in a further step under modified reaction conditions. Here, the template compound can in each case be added both in the first step and in the second step. However, it is also possible to add sufficient template compound as early as in the first step such that template compound no longer has to be added in one of the following steps for the adaptation of the polymer conformation. Obviously, the present invention also includes an embodiment of the process in which in one step, by means of the deformation, the reaction conditions change by themselves in such a way that the adaptation of the conformation of the identical or of a further polymer to the template compound takes place without influence on the reaction conditions from outside. Inter alia, what is in mind here is, for example, a temperature change and/or change of the viscosity in the system. It is likewise possible that by means of the adaptation of the conformation, the state of aggregation of one of the reactants changes in one step. Thus it is possible that by means of addition of template and change in the conformation, a polymer which was present in dissolved form changes into the suspended state as a solid. Likewise, a suspended polymer can go into solution.

In a preferred embodiment of the process according to a preferred aspect of the invention, in at least one step the conformation of the at least one polymer which results from the adaptation is fixed by crosslinkage. The present invention therefore also describes a process, as described above, characterized in that the adaptation of the conformation according to (ii) takes place in at least two steps and the conformation is fixed at least once by crosslinkage.

Inter alia, it is possible here that the conformation of at least one polymer, as described above, is adapted in one step and this at least one conformation is fixed by crosslinkage, as described above. In a further step, at least one conformation of the same or of another polymer is adapted to at least one template compound, where this at least one template compound can be identical to or different from that employed in the first step. The preferred conformation which is obtained in this further step can be fixed either by crosslinkage or alternatively not be fixed.

In a preferred embodiment of the process according to a preferred aspect of the invention, at least the preferred conformation which results from the last adaptation step is fixed by crosslinkage. In a further preferred embodiment, functional groups which may be present, which lie, for example, on the outside of the polymer network, are reacted with at least one end-capping reagent. As an end-capping group, in principle any group can be selected which makes a functional group inert or to the greatest extent inert to certain interactions. The end-capping group which can be used here is any suitable group according to the prior art. Depending on the substrate, it is, for example, possible that the end-capping group selected is a group which is not an H donor. Preferably,

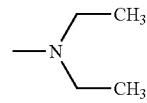

is employed here, particularly preferably

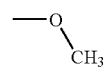

Sterically demanding end-capping groups such as a t-butyl radical or an optionally suitably substituted benzyl radical are further preferred.

By means of the end-capping process or by means of other suitable subsequent reaction, it is very generally possible to introduce additional, as a rule non-specific, interaction sites into the polymer network.

A process is likewise preferred in which, in the case where the adaptation is carried out in two or more steps, after each step the preferred conformation obtained from this step is fixed by crosslinkage.

A preferred aspect of the present invention therefore also relates to a process, as described above, characterized in that, after each step the preferred conformation obtained from this step is fixed by crosslinkage.

With respect to the procedure, reference can be made to the adaptation and crosslinkage, as described above. In particular, it is possible to carry out the adaptation and crosslinkage successively or simultaneously in one step, as is likewise described above.

Obviously, in the context of the process according to a preferred aspect of the invention it is also possible that at least one of the template compounds is not present in one or alternatively a number of steps in which the conformation of at least one polymer is adapted to at least one template compound.

A preferred aspect of the present invention therefore also relates to a process, as described above, characterized in that at least one step is carried out in the absence of the at least one template compound.

Thus it is possible, inter alia, that by intramolecular crosslinkage of a polymer or two or more different polymers or by intermolecular crosslinkage of a polymer or two or more different polymers the conformation can be influenced such that the preferred conformation resulting from crosslinkage is adapted to one or more template compounds. In particular, it is possible here that the chemical structure of the polymers and/or the specific nature of the at least one crosslinking reagent are selected such that the at least one preferred conformation, which results from the crosslinkage, is adapted to at least one template compound.

It is further also possible in this respect that the conformation is adapted without crosslinkage in the absence of the at least one template compound in one or more steps. Inter alia, it is possible here that the conformation is influenced in a first step by addition of at least one crosslinking compound without crosslinking taking place, where here too the cases are included in which, for example, although a crosslinking reagent reacts with one or more polymers, the preferred conformation is still not fixed.

In a preferred embodiment, the process according to a preferred aspect of the invention is carried out in such a way that the at least one preferred conformation which is obtained from each step is fixed by crosslinkage irrespectively of whether the adaptation takes place in the presence or absence of the at least one template compound.

With respect to the embodiment in which the at least one template compound is not present in one or more steps in which an adaptation takes place, it is possible, inter alia, to adapt the at least one conformation of the at least one polymer stepwise to the at least one template compound. In a first step, for example, a conformation can be fixed here which is only roughly adapted to the at least one template compound. In a further step, the conformation fixed in the first step can again be influenced and the conformation obtained, which is now better adapted to the at least one template compound than the conformation fixed in the first step, can be fixed. This process can be continued until the conformation corresponds to the desired preferred conformation.

All suitable processes can be employed for this stepwise adaptation of the conformation.

As an example of a stepwise adaptation, inter alia, the possibility may be mentioned of employing, in a certain step, one or more crosslinkers whose chain length is shorter than that of the crosslinkers of the preceding step. In this manner, it is possible, for example, for a conformation resulting from crosslinkage, in the form of a two- or three-dimensional pore, to be made narrower stepwise. Obviously, the present invention also includes embodiments of the process in which in any two or more steps the same crosslinkers are employed, these crosslinkers crosslinking, for example, different polymers in each case in different steps, causing different intramolecular crosslinkages at various sites in a polymer or causing an intramolecular crosslinkage in one step, and an intermolecular crosslinkage in another step.

Obviously, it is also possible to change the chemical structure of the crosslinker instead of the chain length or additionally to the chain length, such that in various steps various polymers in each case can be crosslinked and/or polymers can in each case be crosslinked with one another intra- and/or intermolecularly in various sites.

A preferred aspect of the present invention further also includes embodiments in which crosslinking is carried out in a first step and a crosslinkage takes place in any further step, which is realized by reacting the at least one crosslinking reagent, through which crosslinkage takes place in the further step, in the crosslinkage, for example, with at least one functional group which results due to the crosslinkage in the first step or is incorporated into the polymeric structure which was obtained from the first crosslinking step by at least one of the crosslinking reagents which are employed in the first step.

Very generally, in a stepwise adaptation the nature of the at least one crosslinking reagent and the concentration of at least one of the crosslinking reagents can be varied in each step. Likewise, it is also possible, instead of this and/or additionally, to vary the reaction conditions such as nature of the solvent, pressure, temperature, pH of the solution and/or the suspension in which the crosslinkage takes place or one or more further suitable parameters.

If the adaptation and/or the attachment takes place in a number of steps, the degree of crosslinkage which takes place per crosslinking step is essentially arbitrary. In a preferred embodiment, the degree of crosslinking per step is in the range from 2 to 5%, a total degree of crosslinking of preferably 8 to 30% being achieved. The percentages with respect to one step are here in each case based on the number of monomer units of a polymer chain which is only crosslinked with one further polymer chain. The percentage with respect to the total degree of crosslinkage is based on the total of all monomer units in the polymer network. For the degree of crosslinking of a polymer chain which is crosslinked with two further polymer chains, values of the degree of crosslinkage per step in the range from 4 to 10% accordingly result.

Owing to the crosslinkage, in the context of the process according to the invention a polymer network is constructed which has two- or three-dimensional cells via which the polymeric structure interacts with the at least one template compound. Particularly preferably, the degree of crosslinking and/or the crosslinking reagent is selected such that no multiple-layer solvate shells are formed in these interacting cells of the polymer structure. Preferably, this property of the interacting cells can be influenced by the chemical nature of the polymers and/or crosslinking reagents used, in that, for example, hydrophilic groups make solvent access to the interacting cell difficult when using polar solvents.

As far as the specific selection of the at least one polymer employed, the nature of the at least one crosslinking reagent, the variation of the chain length and/or the chemical structure of the crosslinking reagents, the degrees of crosslinking achieved and all further reaction parameters, such as described above by way of example, are concerned, predictions or estimates can be made in the process according to the invention, for example, by computer-modelling procedures.

Obviously, it is also possible that the reaction conditions which are necessary for one step do not have to be imprinted from outside the system, but are established in the preceding step by themselves. Mention may be made by way of example here, for example, of temperature changes due to exo- or endothermic reactions, changes in the pH due to reaction products from crosslinking reactions or transition from homogeneous to heterogeneous reaction, which can take place, for example, if a polymer or any polymer structure no longer dissolves due to crosslinkage, but is present suspended as a solid.

If the stepwise adjustment and attachment is carried out in the presence of the template compound, it is in particular possible that after each step the template compound is removed from the resulting polymeric structure and in the next step the same or another template compound is again added. In this respect, the template compound can be removed, for example, as a solution by means of filtration, osmosis or dialysis or removed from the solid support.

All embodiments which are described above for steps which are carried out in the absence of the at least one template compound can obviously also be employed in steps in which the at least one template compound is present if the presence of the at least one template compound allows the specific embodiment.

In a preferred embodiment, a polymeric structure which is adaptable to a number of template compounds which are different from one another is created by crosslinkage of a polymeric structure in one or more steps in the absence of the at least one template compound. For example, this can be carried out by producing by crosslinkage a polymeric structure which has two- and/or three-dimensional pores which are accessible to these template compounds and where the chemical structure of these pores is constituted such that the template compounds can interact with the pores. Inter alia, it is possible here that all pores are similar, accessible to all different template compounds and are constituted such that the template compounds can interact with these pores. Obviously, it is also possible that two or more pores which are different from one another are formed, where each pore type can be accessible to at least one of the desired template compounds. Likewise, it is possible that some of the pores are not accessible to the desired template compounds, but are made accessible after further adaptation, for example by crosslinkage, as described above, to at least one of the desired template compounds.

In a further preferred embodiment of the process according to a preferred aspect of the invention, at least one suitable support material is employed in the preparation of the polymer network.

The term "suitable support material" here includes all support materials which can interact covalently or non-covalently with at least one of the polymers employed and/or with at least one structure which results from at least one step in which the adaptation according to (ii) and/or attachment according to (iii) takes place. Likewise, this term includes all support materials which can be crosslinked covalently or non-covalently with at least one of the polymers employed and/or with at least one structure which results from at least one step in which the adaptation according to (ii) and/or attachment according to (iii) takes place, using at least one crosslinking reagent.

Accordingly, inter alia, support materials are possible which are soluble in the at least one solvent in which the polymeric network is prepared or are present suspended as solid. Likewise, it is possible that in the case where a solvent exchange takes place or a solvent is added during the preparation of the polymeric network the at least one support material which is firstly present suspended as a solid goes into solution or is firstly present dissolved and then present suspended as a solid. If two or more different support materials are employed, these can obviously be present separately from one another in solution or be suspended as a solid.

In the case where the at least one support material is a solid, its surface can essentially be of any desired shape. Inter alia, for example, plane surfaces such as in the case, for example, of glass or metal plates or curved surfaces or surfaces embedded in porous materials such as tubular or spongy surfaces such as in, for example, zeolites, silica gel or cellulose beads are possible.

In particular, a preferred aspect of the present invention includes embodiments of the process according to the invention in which the polymeric network is prepared on at least one of these suitable support materials.

A preferred aspect of the present invention accordingly also relates to a process, as described above, characterized in that the polymeric network is prepared on at least one support material.

Inter alia, it is possible here that the polymeric network is prepared first and then applied to the at least one support material. Likewise, it is possible that the polymeric network is prepared in the presence of the at least one support material and the polymeric network is then applied by, for example, crosslinkage to this or another support material. If the preparation of the polymeric network, as described above, is carried out in two or more stages, it is possible to bring the polymeric structure which results from any step into contact with the at least one support material and, for example, to apply it thereto by crosslinkage. If two or more different support materials are employed, it is possible to employ these together or alternatively separately from one another. In the case of stepwise preparation of the polymeric network, it is possible, for example, after each step to add support material, where, if appropriate, different support material can be employed in each case.

Accordingly, the process according to a preferred aspect of the invention also opens up the possibility of influencing the conformation of the at least one polymer, which is adapted to at least one template compound in at least one step, via the at least one support material. In particular, the at least one support material can be a polymer or a polymer network, where a polymer network prepared according to the invention can also be employed as a support material. Here, inter alia, a general copying process is accessible which makes it possible, for example, to produce a number of consecutive positive and negative prints.

In a preferred embodiment, the polymeric network is prepared according to a process in which the at least one polymer is applied in layers to at least one support material.

The term "layer", as is used in the context of the present application, here includes, inter alia, both layers in which the at least one polymer is applied in loose tangles and layers in which the at least one polymer is applied in largely untangled form.

In a first embodiment, the at least one polymer is applied in such a way that it is in largely untangled structure, but is brought into contact with support material and/or polymer layer already applied as closely as possible above the theta point. In this embodiment, for the solution in which this at least one polymer is dissolved and brought into contact with support material and/or polymer layer, a solvent or solvent mixture is selected in which the polymer is present in largely untangled form, where obviously the untangled form of the polymer can be assisted by the specific choice of other reaction conditions such as temperature, pressure or pH. Here, an optimization preferably takes place between polymer folding and partition coefficients of the polymer which are as large as possible. For this preferred embodiment, polymers are very particularly preferably used which have a molar mass of less than approximately 30 000 g/mol. By means of this embodiment, the application of largely monomolecular polymer layers is favoured.

In a second embodiment, solvent or solvent mixture or other reaction conditions are selected in such a way that the at least one polymer is found in the solution in the vicinity above the theta point. By means of this specific embodiment, which is very particularly preferably favoured by polymers having a molar mass in the range of more than approximately 30 000 g/mol, it is possible to favour the application of the polymer in loose polymer tangles.

In a third embodiment, solvent or solvent mixture or other reaction conditions are chosen such that the at least one polymer is found in the solution in the vicinity below the theta point. Here, inter alia, it is possible to apply nanoparticles formed from the at least one polymer.

Application in layers is possible, inter alia, by bringing into contact at least one suitable support material with a suitable polymer and the polymer being spontaneously arranged on the at least one support material in layers under the chosen reaction conditions, where at least one conformation of the polymer can be adapted and fixed in the presence or absence of the at least one template compound, as described above. Likewise, it is possible to employ two or more different suitable polymers simultaneously, which are arranged on the support material spontaneously in layers under the chosen reaction conditions. Here too, at least one conformation of at least one of the polymers can be adapted and fixed in the presence or absence of the at least one template compound, as described above.

On application, in principle all polymers such as those already described above can be employed. The molar mass of the polymers employed is preferably in the range from 2 000 to 100 000 g/mol, further preferably in the range from 5 000 to 30 000 g/mol.

Preferably, the application of one or more polymers in layers is carried out in individual steps.

Accordingly, a preferred aspect of the present invention also relates to a process, as described above, which is characterized in that the at least one polymer is applied to the at least one support material in layers in at least two successive steps.

As already described above, it is possible here, inter alia, to first prepare a polymeric structure which consists of two or more layers, where this can be carried out in one or alternatively a number of steps. In one or more further steps, this polymer structure can then be applied to the at least one support material, where, if appropriate, at least one further layer can be applied to the polymeric structure in one or more further steps. The adaptation of at least one conformation of at least one of the polymers involved can be carried out according to one or more of the embodiments already described above. Since it is possible in the process according to the invention to prepare nanoparticles, it is possible, in particular, to apply nanoparticles to the support material which are present in dissolved, colloidally dissolved or suspended form.

In a preferred embodiment, in a first step one or more layers of at least one polymer are applied to at least one support material. In at least one further step, at least one further layer is then applied to the resulting structure. Each layer here can comprise identical polymers or alternatively two or more polymers which are different from one another. The adaptation of at least one conformation of at least one of the polymers involved can be carried out according to one or more of the embodiments already described above.

In a particularly preferred embodiment, the application of the at least one polymer in layers to the at least one support material is carried out according to a process in which a layer of a polymer is first applied covalently, preferably non-covalently, to at least one support material. In a further step, at least one crosslinking reagent is added in the presence or absence of the at least one template compound in such a way that the crosslinkers react via at least one functional group with the polymer applied to the support material, so that preferably a predominant part of the crosslinking reagents is able, in each case via at least one further functional group, to react with at least one further polymer which is applied in the next layer. In a next step, a further layer of at least one further polymer is then applied and crosslinked with the first polymer layer by reaction with the functional groups already mentioned. After this, one or more further steps can follow, in which crosslinking reagent in each case reacts with a polymer layer, at least one further polymer is added and a new polymer layer is formed via crosslinking with the polymer layer applied beforehand. Each step here can be carried out in the presence or absence of the at least one template compound.

In the case of the preparation of the polymeric network in layers in the presence or absence of the at least one template compound, it is necessary under certain circumstances, in the case of the formation of a new layer, to avoid crosslinkages within at least one of the layers already applied to the support material and/or between the polymers which are intended to form the new layer. In this connection, three particularly preferred embodiments (a) to (c) may be mentioned, according to which this application in layers can take place, which with respect to (a) and (b) can further particularly preferably be used with non-specific or non-selective crosslinking reagents:

(a) In a first process variant, the reaction of an already applied polymer layer takes place with the at least one crosslinking reagent at low temperature, the crosslinking reagent predominantly reacting at one end. The at least one, preferably dissolved, polymer for the next step is then added, the reaction conditions being varied in a suitable manner such that a reaction takes place mainly with the polymer then added.

(b) In a second process variant, a polymer structure which comprises one or more polymer layers applied to at least one support material, is mixed together with a polymer solution from which the second polymer layer is to be formed, and at least one crosslinking reagent. By means of a suitable modification of the reaction conditions, which can be carried out slowly or rapidly, conditions are established in which the at least one crosslinking reagent reacts simultaneously with the polymer layer already present and the polymers which are intended to form the next layer, with formation of this layer, the crosslinkage described above, which is to be avoided, being exceeded for entropy reasons by the preferred crosslinkage, which leads to the formation of the new layer.

(c) In a third process variant, the reaction is carried out with two different temperatures or pHs or solvents or solvent mixtures or other differences in the reaction conditions using a specific or selective crosslinker.

In a very particularly preferred embodiment, the method (a) is carried out such that the crosslinking reagent is brought into contact with the polymer layer applied last at temperatures at which the crosslinking reagent is statistically uniformly distributed over the polymer layer already present and at which a reaction of the crosslinking reagent with the polymer layer already present largely [lacuna]. The temperatures at which the reaction is carried out in this respect are as a rule in the range from 0 to −70° C.

In the choice of the other reaction conditions such as, for example, pH, nature of the solvent, concentration of the crosslinking reagent in the solvent, in this preferred embodiment of the process care is also to be taken that the reaction of the crosslinking reagent with the polymer layer present largely does not occur until the crosslinking reagent is statistically uniformly distributed over the polymer layer already present.

By means of appropriate variation of the reaction conditions, in a next step the statistically uniformly distributed crosslinking reagent is reacted with the polymer layer already present in such a way that the crosslinking reagent mainly reacts via one or more functional groups and at least one functional group of the crosslinking reagent, via which the crosslinkage to the next polymer layer takes place, does not react with the polymer layer already present. As a rule, this again takes place at low temperatures, these as a rule being in the range from 0 to −10° C. This is further favoured by the use of short-chain crosslinking reagents and/or the immobilization of the polymer layer. Possibilities as to how this crosslinkage can be induced, inter alia, are, for example, also application of ultrasound or photochemical crosslinkage.

Obviously, it is also possible, in the case of appropriate crosslinking reagents and/or in the case of an appropriate polymer layer already present, to control the reaction procedure described above by variation of the pH and/or variation of the solvents and/or by addition of modifiers, obviously combinations of one or all methods also being possible.

In this connection, reference can also be made to the specific methods which can be used as described above in order initially to suppress the bonding of a polymer and to stimulate it in a further step.

According to method (a), in a next step a solution which comprises the at least one polymer, which is to be applied as the next polymer layer, is brought into contact with the reaction product of crosslinking reagent and polymer layer already present. The reaction conditions are then modified such that the reaction particularly preferably takes place between the non-reacted functional groups of the crosslinking reagent bonded to the polymer layer already present and the polymers to be applied as the next polymer layer. Inter alia, it is also possible here that the reaction conditions are influenced by addition of the solution which comprises the at least one polymer which is to be applied as the next polymer layer in such a way that a further modification of the reaction conditions no longer has to take place.

With respect to this step of application of the next polymer layer, reference can also be made, inter alia, to the specific methods which can be used as described above in order first to suppress the bonding of a polymer and to stimulate it in a further step.

In a likewise particularly preferred embodiment, the method according to (b) is carried out in such a way that the solution, comprising the at least one crosslinking reagent and the at least one polymer, is brought into contact with the last-applied layer of the at least one polymer under reaction conditions in which firstly no reaction takes place, but both crosslinking reagent and polymer to be applied are statistically uniformly distributed over the polymer layer already present.

As already described in connection with the method (a), in a preferred embodiment this bringing into contact takes place at low temperatures, as a rule in the range from 0 to −70° C.

In the choice of the other reaction conditions such as, for example, pH, nature of the solvent, concentration of the crosslinking reagent in the solvent or concentration of the polymer to be applied in the solvent, in this preferred embodiment of the process care is also to be taken that the reaction of the crosslinking reagent with the polymer layer present and the reaction of the polymer to be applied with the crosslinking reagent largely does not occur and the crosslinking reagent and the polymer to be applied are statistically uniformly distributed over the polymer layer already present.

In a next step, the reaction conditions are then modified in such a way that the crosslinking reagent reacts both with the polymer layer already present and with the polymer which is applied as the next layer. Here, it is possible, inter alia, that the crosslinking reagent reacts first with the polymer layer already present and then with the polymer to be applied with formation of the new polymer layer. Likewise, it is possible that the crosslinking reagent reacts simultaneously with the polymer layer already present and the polymer to be applied with formation of the new polymer layer. It is further possible that the statistically uniformly distributed crosslinking reagent reacts first with the statistically uniformly distributed polymer and the reaction product then reacts with the polymer layer already present with formation of the new polymer layer. If the reactions of the crosslinking reagent with the polymer layer already present on the one hand and the polymer to be applied on the other hand do not take place simultaneously, it is possible, by variation of the reaction conditions, first to carry out one of the reactions, and by further variation of the reaction conditions to carry out the other reaction.

As far as the modification of the reaction conditions is concerned, reference may be made here to all possibilities and combinations already described above. In particular, with respect to this step of the application of the next polymer layer, reference can also be made, inter alia, to the specific methods which can be used as described above in order first to suppress the bonding of a polymer and to stimulate it in a further step. Possibilities as to how this crosslinkage can be induced, inter alia, are, for example, also use of ultrasound or photochemical crosslinkage.

Use of ultrasound or photochemical crosslinkage are obviously methods which in principle can be employed very generally in any crosslinking step such as is carried out in the context of the present invention.

The term "selective/specific crosslinking reagent" is understood in the context of a preferred aspect of the present invention as meaning a crosslinking reagent which has two or more different functional groups, of which at least one group, in comparison with at least one group which is different therefrom, preferably reacts with a functional group of a further polymer or the support material under given reaction conditions. The term furthermore includes those crosslinking reagents which have two or more identical functional groups, but whose chemical environment differs and/or which are sterically differently arranged and of which therefore at least one preferably reacts with a functional group of a further polymer or the support material under given reaction conditions. Likewise, this term comprises those crosslinking reagents which have functional groups which are identical to or different from one another, which therefore differ in selectivity/specificity, because some of the functional groups are activated with an activating reagent according to a process such as described above. Obviously, in the compounds which have two or more different functional groups, one or alternatively a number of the functional groups can be activated with reactive groups which are optionally different such that the reactivity of one part of the optionally activated groups differs from the reactivity of the other part of the optionally activated groups. Combinations of two or more of the described influences, which act on the specificity/selectivity, are obviously likewise possible.

In a particularly preferred embodiment, the application in layers is carried out in the presence or, preferably, absence of the template such that a degree of crosslinking is present between the layers which leads to an insoluble, but swellable polymer network which preferably has interaction cells which are capable of interaction with the at least one template compound. In these interaction cells, in general, the functional groups of the swellable polymer network are on average in a steric arrangement which is favourable according to distance and angle with respect to the interaction with the at least one template compound.

In a further preferred embodiment, the conformation of this swellable polymer structure is adapted in the presence of the at least one template compound to the at least one template compound in at least one layer and fixed by crosslinkage.

A preferred aspect of the present invention therefore also relates to a process, as described above, characterized in that the application in layers leads to a swellable polymer network which has a conformation which is adapted to the at least one template compound in at least one further step in the presence of the at least one template compound and is fixed by crosslinkage.

With respect to the application in layers to at least one support material, all suitable crosslinking reagents such as have already been described above can be employed.

By way of example, bivalent epoxides, isocyanates, amidines, chlorotriazines or aldehydes may be mentioned. Those preferred are, for example, succinimide derivatives, particularly preferably ONB- and N-hydroxyphthalimide-activated reagents. In a further preferred embodiment, bivalent, symmetrical or unsymmetrical crosslinking reagents are employed. For example, activated dicarboxylic acids may be mentioned here. In a further embodiment, specific or selective crosslinkers are employed. These can be, for example, polybasic carboxylic acids, diamines, diols or further suitable compounds which are activated with different reactive groups. Likewise, they can be compounds having at least two functional groups which are different from one another, which on activation with one compound or with two or more compounds which are different from one another on activated groups which are different from one another have different reactivity.

The chain length of the crosslinking reagents is essentially arbitrary and can be adapted to the particular requirements of the reaction procedure and/or to the polymers employed and/or to the at least one template compound. The chain length here can reach from 2, such as oxalate, up to chain lengths of oligomers or polymers. The chain of the crosslinker itself can be aliphatic and/or araliphatic and/or aromatic and for its part can carry functional groups which, for example, have been introduced specifically into the chain, for example by a process for the preparation of a polycondensation product, as described above, and which are suitable for interaction with the at least one template compound and/or for a further crosslinkage, as is the case, for example, with, inter alia, oligoethylene oxide.

In a very particularly preferred embodiment, the last crosslinking step which takes place in the adaptation of the conformation of the polymeric network and the fixing of the preferred conformation of the polymeric network is carried out by a rigid crosslinking reagent such as, for example, terephthalic acid or biphenylcarboxylic acid. Obviously, this crosslinkage by a rigid crosslinker can be carried out either with polymeric networks prepared in solution or on a support.

For the preparation of the swellable polymer network, inter alia, crosslinking reagents with flexible chains having a chain length in the range from 4 to 24 atoms, particularly preferably from 8 to 12 atoms, are preferably employed.

On application of a layer of at least one polymer to the at least one support material, a solvent or solvent mixture is very particularly preferably used in which the at least one polymer is largely present in denatured form, for example above the theta point. By means of this very particularly preferred embodiment, the deposition of a monomolecular layer of the at least one polymer on the at least one support material is favoured. In a likewise very particularly preferred embodiment, this deposition of monomolecular layers is furthermore promoted by the specific use of polymers having molar masses of less than 30 000 g/mol.

Obviously, it is of course also possible to work in the vicinity of the theta point, whereby, for example, the deposition of loose polymer tangles on the at least one support material can be achieved. With respect to this embodiment, polymers are preferred whose molar mass is in the range from approximately 30 000 to approximately 100 000 g/mol.

In this respect, the deposition can also be promoted by addition of at least one poor solvent and/or by modification of the pH and/or by addition or buffers and/or salts and/or suitable organic auxiliaries. It is likewise possible to concentrate the solution in which the at least one polymer is present in dissolved or suspended form, where in a particularly preferred embodiment the concentration of the at least one polymer in the liquid phase is kept approximately constant. On account of this, it is possible to apply the at least one polymer approximately quantitatively as a layer on the at least one support material.

As far as the deformation of the conformation of the at least one polymer into a preferred conformation and the subsequent crosslinkage, this is preferably carried out in the process according to the invention in all procedures outlined above in solution or on a support, very particularly preferably such that, in order to achieve the establishment of the preferred conformation of the polymer in the presence of the template compound, the reaction is carried out at high temperatures, preferably in the range from more than 50° C., particularly preferably in the range from 60 to 105° C. and further particularly preferably in the range from 70 to 80° C. Obviously, this temperature range can be tailored to the solvent or solvent mixture employed. In a further step, the crosslinking reagent is added at low temperatures, preferably in the range from 0 to −70° C., whereby a statistically uniform distribution of the crosslinking reagent over the polymer is preferably achieved. By suitable variation of the reaction conditions, as already described above, following this the reaction of the polymer with the crosslinking reagent is induced.

In a likewise preferred embodiment, the process is carried out with respect to all procedures in such a way that on applying the polymer a solvent or solvent mixture is employed in which the polymer is close to the insolubility limit, whereby the distribution coefficient for the application of the polymer assumes a favourable value. Particularly preferably, the process is carried out such that the polymer is in the vicinity of the theta point. In this preferred manner of carrying out the reaction, it is avoided, inter alia, that the polymer precipitates.

The at least one solvent is further preferably selected in such a way that the interactions of the interaction cells, such as are described in the context of the present invention, with the solvent are largely negligible compared with the interactions of the interaction cells with the template compound.

The deformation in the presence of the template compound is further preferably performed in solvent mixtures of defined polarity depending on the functional groups which [lacuna] on the crosslinker and/or in the polymer strand and/or in the side chains of the polymer which, for example, form the abovementioned interaction cells. In particular, organic and/or aqueous solvents are suitable here, the pH of the solutions further preferably being in the range from 4 to 9 and particularly preferably in the range from 6 to 8. As solvents which are preferred, inter alia, mention may be made, for example, of chlorohydrocarbons having up to 3 carbon atoms, such as chloroform, or nitrites, such as acetonitrile, or esters, such as ethyl acetate, or ketones, such as methyl ethyl ketone or acetone, or open-chain or cyclic ethers such as methyl tert-butyl ether or tetrahydrofuran or dioxane, or optionally suitably substituted aromatics such as toluene or xylene, or mixtures of two or more thereof.

In a particularly preferred embodiment, the adaptation of the conformation of the polymer to a template compound is carried out in accordance with the process according to the invention in a solvent mixture and under reaction conditions in which the polymer is largely insoluble, but the template compound is soluble.

In an embodiment which is preferred, inter alia, all process steps, individually or in suitable combinations, can be carried out as combinatorial test methods.

It is possible here, for example, to adapt the conformation of a polymer or of a polymeric structure which, for example, is preferably applied to a support, in a combinatorial test method to a number of different template compounds and to crosslink the resulting preferred conformations, identical polymers or polymeric structures in each case being brought into contact here with different template compounds in each case.

Likewise, it is possible, for example, to react identical template compounds with a number of different polymers or polymeric networks in each case and, for example, to crosslink the preferred conformations obtained.

Obviously, it is also possible to carry out process steps in the preparation of the polymeric network in combinatorial test methods, where it is possible, inter alia, to vary the support, the polymer, for example with respect to the degree of derivatization and/or the number and nature of the receptor groups, the crosslinking reagent, for example with respect to the chain length, the number and/or the nature of the functional groups, the degree of crosslinkage in the polymeric network or alternatively the number of layers applied to the support.

Additionally preferably, these combinatorial test methods can be coupled with statistical experimental planning. Such combinatorial or statistical/combinatorial methods can accordingly also be used for the preparation of the polymer derivatives as described above, crosslinking reagents, for the preparation of a polymeric network on a support or in solution or alternatively for testing the polymeric network in application areas such as are described, for example, below.

Particularly suitable for these combinatorial or statistical/combinatorial test methods are, inter alia, flow processes, variants such as automation by means of valve circuits, reagent recycling or stop-flow techniques also being possible. These flow processes can be employed under suitable boundary conditions even for the production of relatively large amounts of the polymer derivatives as described above, crosslinking reagents and polymer networks on a support or in solution.

In addition to the process for the preparation of the polymeric network, the present invention also relates to the polymeric network itself, which is preparable according to a process as described above.

In a likewise preferred embodiment, polymeric networks in the form of clusters, microlatices and/or nanoparticles are obtained from the process according to the invention. These can be processed further as a true solution, or as a colloidal solution or suspension. In particular, these clusters, microlatices and/or nanoparticles can be crosslinked covalently and/or non-covalently to layers, for example to membranes or solids, which, for example, can be porous. This crosslinkage can in turn also take place according to the process according to the invention, and the resulting structure can be adapted to one or more template compounds and fixed by means of this crosslinkage. By specific choice of the preparation and of the procedure, for example by addition of, for example, suitable pore formers, stabilizers, detergents, protective colloids, suitable solvent mixtures, by the manner of stirring, ultrasonic treatment or particle generation by spraying, it is possible, for example, to prepare preferably round particles having a specific porosity.

Inter alia, two methods for the preparation of the clusters, microlatices and/or nanoparticles are particularly preferred in the context of the process according to the invention.

In one method, a polymer of sufficient molar mass, preferably having a molar mass in the range from 30 000 to 100 000 g/mol, is introduced in such a high dilution and/or under such further reaction conditions that the polymer is present largely in tangled form. In particular, the choice of the solvent which assists this tangled form is important here. With addition of crosslinker, these polymer tangles, if appropriate in the presence of template compound, are intramolecularly crosslinked without intermolecular crosslinkage taking place. The functional groups lying on the outside of the polymer tangle are also reacted with the crosslinking reagent here. By means of these outsides activated in such a way, it is then possible in a further step to crosslink the nanoparticles intermolecularly, where depending on the chain length of the crosslinking reagents via which the crosslinkage takes place and/or depending on the at least one template compound which is optionally present in the intermolecular crosslinkage, the mesh width of the resulting structure, such as a porous membrane, can be controlled.

In the other method, the process is carried out in such a way that the functional groups on the outside of the intramolecularly crosslinked polymer tangle are not reacted with crosslinker. In a further step, the solution which comprises the polymer tangles is concentrated, whereby, with sufficient concentration, the polymer tangles agglomerate to give three-dimensional structures by reaction of the functional groups lying on the outside.

In contrast to the imprinting phases prepared according to the prior art, the polymer networks prepared according to the invention have, for example, the advantage of a significantly higher loading ability. The loading ability here indicates how many grams of a substrate are contained per gram of the coated support material. Values between 4 and 7% are typical here. With respect to the mass of the actually active polymer layer, this loading ability is already in the order of magnitude of preferably 30 to 50% with 3 layers. By the application of further polymer layers, it is thus possible to increase the percentage loading ability of the coated support material again markedly.

While the imprinting phases have a loading ability which is customarily in the per thousand range, it is possible without problems to prepare polymer networks by the process according to the invention which have a loading ability in the percent range. In the industrial application of the polymers prepared according to the invention, a significantly higher economy can thus be achieved.

In principle, the polymeric networks prepared according to the invention can be employed in all suitable processes. Processes are particularly preferred here in which the at least one preferred conformation which is fixed by crosslinking and which is adapted to at least one template compound is utilized. Accordingly, application areas which may be mentioned are, for example, preferably substance separation processes such as liquid-chromatographic or gas-chromatographic processes, membrane separation processes, dialysis processes, or substance conversion processes such as homogeneous or heterogeneous catalysis.

The polymers prepared according to the invention can further be employed

- as an assay or in a (rapid) test in combination with analytical or diagnostic methods, courses and/or detection reagents,
- as a support for substances which are to be released, for example in a controlled manner, inter alia, under defined conditions, where "drug release" should be mentioned as a keyword here,
- as a sensor, indicator or detector on surfaces or in cavities, or
- as a medicament or vaccine for, for example, competitive inhibition or blocking of antigenic groups, for example of receptors or epitopes on cells, cell constituents, microorganisms, allergens, whereby, for example, passive immunization can be achieved.

In a likewise preferred use, the polymeric network prepared according to the invention is employed in substance preparation processes. Examples of these which may be mentioned, inter alia, by way of example are reproduction processes. Here, using the polymers prepared according to the invention, copies of largely arbitrary (macro)molecular patterns can be prepared and these can in turn be copied, a duplicate of the original pattern which is isosteric, for example, preferably with respect to nanoenvironment, resulting. In the context of the process according to the invention, receptors of interest of a pattern can be scanned here and this negative converted into a positive isosteric to the receptor. The present invention therefore also describes the use of the process according to the invention in substance preparation processes. In the case where this embodiment is used in drug design, a novel, pharmacologically active substance can be bonded to the isosteric positive, for example, without side effects, tested or catalytically synthesized. The present invention thus also includes supralithographic reproduction techniques in the nano range, whose products can then in turn be employed, for example, for active immunizations.

Accordingly, a preferred aspect of the present invention also relates to the use of a polymeric network, preparable according to a process as described above, in substance separation processes, substance conversion processes, substance preparation processes, substance recognition processes or for the detection of signals. With respect to signals which can be detected, optical, electrical or mechanical signals, inter alia, may be mentioned.

A preferred aspect of the present invention is illustrated in greater detail with the aid of the following examples.

EXAMPLES

Example 1

Coating of silica gel SP 300-15/30 with poly(benzyl N-allylcarbamate) of degree of derivatization 14% and subsequent crosslinkage of the polymer with dodecanedioic acid bis(N-hydroxy-5-norbornene-2,3-dicarboximide) ester Poly(benzyl-N-allylcarbamate) having a degree of derivatization of 14% (1.60 g) was dissolved in boiling glacial acetic acid (100 ml, about 117° C.), diluted with dichloromethane (100 ml, 1.18 mol) after cooling and treated with pyridine (112 ml, 1.42 mol) in order to impair the solubility of the polymer. Subsequently, the resulting turbidity was eliminated using a few drops of glacial acetic acid. After addition of silica gel 300 Å, 20 μm (Daisogel SP 300-15/30) (10.02 g), the mixture was agitated on a shaker for 30 minutes and, after filtering off with suction through a glass frit, washed with dichloromomethane (4×50 ml).

For crosslinkage, the coated silica gel was added to a solution of dodecanedioic acid bis(N-hydroxy-5-norbornene-2,3-dicarboximide) ester (46 mg, 83 μmol) and triethylamine (36 mg, 0.35 mmol) in dichloromethane (60 ml) and the suspension was concentrated to dryness in vacuo (85 mbar, water bath 0° C.). The coated silica gel washed with tetrahydrofuran (60° C., 4×25 ml), filtered off with suction and subsequently washed with dichloromethane (50 ml).

For the second coating, poly(benzyl N-allylcarbamate) having a degree of derivatization of 14% (1.60 g) was dissolved in boiling glacial acetic acid (100 ml, about 117° C.), diluted with dichloromethane (100 ml, 1.18 mol) after cooling and treated with 100 ml of pyridine (100 ml, 1.26 mol) in order to impair the solubility) of the polymer. Dimethylaminopyridine (DMAP, 80 mg, 0.65 mmol) and further) pyridine (12 ml, 0.15 mol) were then added. Subsequently, the resulting turbidity was eliminated using a few drops of glacial acetic acid. After addition of the silica gel which was reacted and coated with the crosslinker, as described above, the mixture was agitated on a shaker for 30 minutes and, after filtering off with suction through a glass frit, washed with dichloromethane (4×50 ml).

The coated silica gel was again crosslinked as described above and then coated with a third polymer layer, according to the second method.

The mixture was swollen in dimethylformamide in a frit (30 min). By slowly passing through a solution of diethylamine (2 ml, 1.42 g, 19.41 mmol) in DMF (40 ml), the residual activated crosslinker groups were deactivated. For complete deactivation, the mixture was rinsed a further four times with the filtrate solution. The mixture was then washed with tetrahydrofuran (60° C., HPLC grade, 4×50 ml) and with dichloromethane (4×50 ml) and sucked dry.

The coated silica gel was treated with glacial acetic acid (100 ml), the suspension was heated to boiling, and the solid was filtered off with suction, washed with dichloromethane (5×50 ml), dried (110° C., 16 h) and sieved through a 45 μm sieve.

The final weight was 9.4 g.

Example 2

Polymer Deformation and Subsequent Crosslinkage

Explanation of the Compounds:
- Silica gel 300 ÅA, 20 μm (Daisogel SP 300-15/30), coated with 3 layers of poly(benzyl N-allylcarbamate) having a degree of derivatization of 7%, which are crosslinked to 2% with dodecanedioic acid bis(N-hydroxy-5-norbornene-2,3-dicarboximide) ester=(1),
- succinic acid bis(N-hydroxy-5-norbornene-2,3-dicarboximide) ester=(2)

A column packed with (1) was conditioned with 0.2% strength (10.5 mmol/l) 5-methyl-5-phenylhydantoin solution (substrate) in CHCl$_3$ and a flow of 0.6 ml/min, about 40 mg of the substrate being adsorbed on the column. 80 μl of glacial acetic acid were then injected and the outflow was collected in two fractions:

1st fraction: From the injection up to the reattainment of the baseline after the substrate peak (6.1 min).
18.2 mg of the substrate were contained in this fraction. Of this, the amount of substrate rinsed in by the eluent in this time of 7.32 mg was subtracted so that a value of 10.9 mg resulted for the amount rinsed out by the glacial acetic acid.
2nd fraction: From the reattainment of the baseline after the substrate peak up to the fresh adjustment of the equilibrium present before injection (6.1 to 80 min).
72.2 mg of substrate were found in this fraction. As 88.7 mg had been rinsed in by means of the eluent in this time (73.9 min), the amount of substrate taken up from the stationary phase was 16.5 mg.

After completion of the injection, the column was dismantled and cooled to 0° C. (about 30 min).

For the preparation of a crosslinker solution, (2) (186.2 mg, 0.423 mmol) was dissolved in 19.24 ml of 0.2% strength (10.5 mmol/l) 5-methyl-5-phenylhydantoin solution and triethylamine (0.76 ml) was added. This solution was rinsed into the system (without column) from a storage vessel cooled to 0° C.

After the baseline was constant, the column was again incorporated into the system so that here it furthermore remained cooled to 0° C. The crosslinker solution was rinsed into the column at 5 ml/min. After the breakthrough of the crosslinker front (UV 265 μm), the flow was stopped.

The column was again dismantled, furthermore cooled to 0° C. for 30 min and then laid in a column thermostat (120 min, 25° C.).

The system (without column) was rinsed with tetrahydrofuran, and the column was incorporated into the system again after a reaction time of 120 min and rinsed with 50 ml of tetrahydrofuran (1 ml/min).

For the deactivation of the still remaining free N-oxy-5-norbornene-2,3-dicarboximide groups of the crosslinker, diethylamine (40.2 mg, 0.55 mmol) (5 equivalents based on maximum N-hydroxy-5-norbornene-2,3-dicarboximide formed) was dissolved (quench solution) in tetrahydrofuran (20 ml), rinsed into the column (1 ml/min), the solution from the column outflow was rinsed into the column again for 5 h and then switched to tetrahydrofuran. After the baseline became constant, the pump was stopped, the column thermostat was set to 50° C. and this temperature was maintained for 30 min. The tetrahydrofuran was then additionally pumped at 1 ml/min until pure tetrahydrofuran was eluted.

What is claimed is:

1. A process comprising:
   (i) crosslinking a polymer; and
   (ii) adapting a conformation of the polymer obtained from step (i) to a template dissolved or suspended in a solvent by interacting the polymer with the template, so as to increase the interaction enthalpy between the conformation and the template by more than 0.1 kcal/mole, the template being a chemical compound or a biological structure;
   wherein the polymer is prepared on a support material.

2. The process of claim 1 further comprising the step of applying the polymer to the support material in layers in at least two successive steps.

3. The process of claim 2 wherein the applying step leads to a primarily crosslinked polymer network that has a conformation that can be adapted to the template.

4. A polymeric network prepared by the process of claim 1.

5. The process of claim 1 further comprising:
   (iii) separating the template from other substances, by the polymer obtained from step (ii) being exposed to a mixture of the template and the other substances and attracting the template to the polymer.

6. The process of claim 1 further comprising:
   (iii) enhancing conversion of the template, by the polymer obtained from step (ii) being exposed to the template and attracting the template to the polymer's surface and temporarily binding the template to the surface.

7. The process of claim 1 further comprising:
   (iii) enhancing an ability to recognize the presence of the template, by the polymer obtained from step (ii) being exposed to the template and attracting the template to the polymer's surface.

8. The process of claim 1 wherein, in step (ii), the polymer is adapted to multiple templates to obtain multiple conformations.

* * * * *